(12) United States Patent
Mattila et al.

(10) Patent No.: US 7,965,309 B2
(45) Date of Patent: Jun. 21, 2011

(54) BEDSIDE VIDEO COMMUNICATION SYSTEM

(75) Inventors: Eric W. Mattila, Aurora (CA); Stanley R. Moote, Toronto (CA)

(73) Assignee: Quickwolf Technology, Inc., Aurora, Ontario (CA)

(*) Notice: Subject to any disclaimer, the term of this patent is extended or adjusted under 35 U.S.C. 154(b) by 1214 days.

(21) Appl. No.: 11/552,328

(22) Filed: Oct. 24, 2006

(65) Prior Publication Data

US 2008/0068447 A1 Mar. 20, 2008

Related U.S. Application Data

(60) Provisional application No. 60/825,828, filed on Sep. 15, 2006.

(51) Int. Cl.
*H04N 7/14* (2006.01)

(52) U.S. Cl. ............... 348/14.08; 348/14.09; 348/14.03

(58) Field of Classification Search .... 348/14.01–14.16; 379/390.01, 388.08, 88.04; 370/260, 261; 340/7.29, 573.1; 455/41.2; 600/300, 301, 600/595, 525

See application file for complete search history.

(56) References Cited

U.S. PATENT DOCUMENTS

| | | | | |
|---|---|---|---|---|
| 3,613,669 A | * | 10/1971 | Corbin et al. | 600/525 |
| 5,305,420 A | | 4/1994 | Nakamura et al. | |
| 5,544,649 A | * | 8/1996 | David et al. | 600/301 |
| 5,553,609 A | | 9/1996 | Chen et al. | |
| 5,810,747 A | * | 9/1998 | Brudny et al. | 600/595 |
| 5,942,986 A | * | 8/1999 | Shabot et al. | 340/7.29 |
| 5,987,519 A | | 11/1999 | Peifer et al. | |
| 5,999,207 A | * | 12/1999 | Rodriguez et al. | 348/14.03 |
| 6,020,916 A | | 2/2000 | Gerzberg et al. | |
| 6,442,432 B2 | | 8/2002 | Lee | |
| 6,487,583 B1 | | 11/2002 | Harvey et al. | |
| 6,620,099 B1 | | 9/2003 | Shimura et al. | |
| 6,638,218 B2 | | 10/2003 | Bulat | |
| 6,731,324 B2 | | 5/2004 | Levy | |
| 6,847,334 B2 | | 1/2005 | Hayhurst et al. | |
| 6,850,889 B1 | | 2/2005 | Zayas, Jr. | |
| 7,038,588 B2 | * | 5/2006 | Boone et al. | 340/573.1 |
| 7,239,338 B2 | * | 7/2007 | Krisbergh et al. | 348/14.01 |
| 2001/0037461 A1 | | 11/2001 | Conrath | |
| 2003/0046108 A1 | | 3/2003 | Labadie | |
| 2004/0117498 A1 | * | 6/2004 | Hashimoto et al. | 709/230 |
| 2004/0148635 A1 | | 7/2004 | Marchant | |
| 2004/0222638 A1 | * | 11/2004 | Bednyak | 290/1 R |
| 2005/0038326 A1 | * | 2/2005 | Mathur | 600/300 |
| 2005/0111388 A1 | * | 5/2005 | Kim | 370/261 |
| 2005/0164633 A1 | * | 7/2005 | Linjama et al. | 455/41.2 |

(Continued)

FOREIGN PATENT DOCUMENTS

WO 9712544 4/1997

(Continued)

OTHER PUBLICATIONS

International Search Report and Written Opinion dated Dec. 7, 2007.
"Telehealth Applications for Flexible, Sustainable Healthcare Delivery" March Healthcare, 2004.

(Continued)

*Primary Examiner* — Melur Ramakrishnaiah
(74) *Attorney, Agent, or Firm* — Calfee, Halter & Griswold LLP

(57) ABSTRACT

A video conferencing system and method for establishing video conference sessions between residents of a facility and remote terminals.

12 Claims, 36 Drawing Sheets

U.S. PATENT DOCUMENTS

2005/0251421 A1  11/2005  Chang et al.
2005/0273494 A1  12/2005  Uchide
2006/0088154 A1*  4/2006  Mukhtar et al. ......... 379/390.01
2007/0186002 A1*  8/2007  Campbell et al. ............. 709/231

FOREIGN PATENT DOCUMENTS

WO    0180059    10/2001

OTHER PUBLICATIONS

"Video Services Gateway & Camera" March Healthcare, 2005.
"March Healthcare—Nursing Station" March Healthcare, Feb. 10, 2006.
"1010 Video Patient Station" ati AmericanTeleCare, 2003.
"Your choice of bedside services" Patientline, Feb. 10, 2006.

* cited by examiner

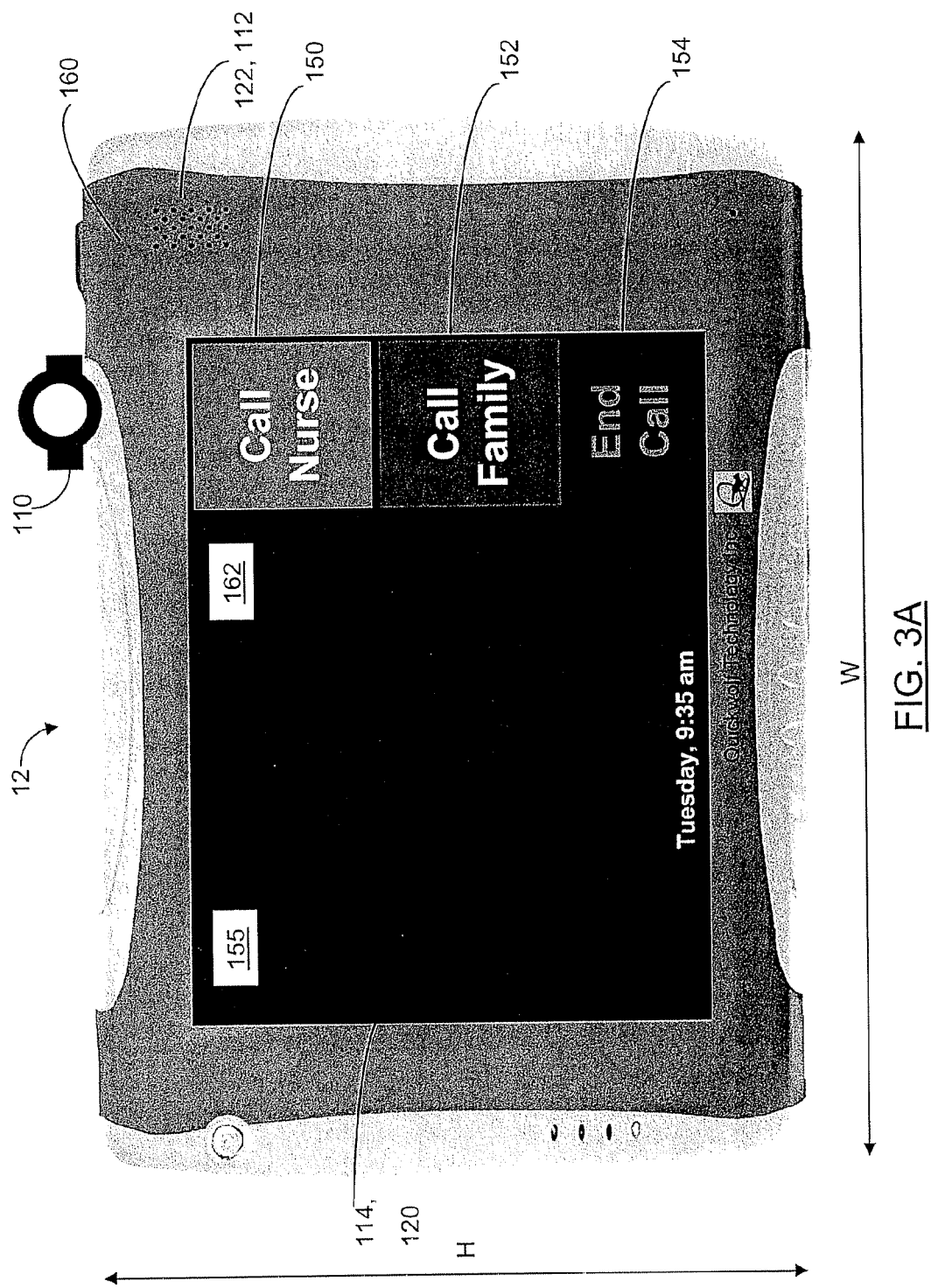

BEDSIDE VIDEO COMMUNICATION SYSTEM

RELATED APPLICATIONS

This application claims priority to, and any other benefit of, U.S. provisional patent application No. 60/825,828 filed Sep. 15, 2006.

FIELD

Example embodiments described herein relate to communications systems and, in particular, to video conferencing methods and systems.

BACKGROUND

Patients or residents of care facilities are often physically separated from health care practitioners within the facility who may be attending to other duties and functions. As well, family members and other parties who would like to communicate with the patient typically are often not able to be physically present at the care facility.

Patients may experience isolation as a result of these difficulties. Also, if a patient requires assistance in the instance of an emergency or other difficulty, health care practitioners or family members may not be able to be physically present to address the patients' needs. Accordingly, it is desirable to provide systems and methods for facilitating communications between residents of care facilities and other parties that are involved in caring for or supporting the residents.

BRIEF DESCRIPTION OF THE DRAWINGS

Example embodiments will now be described by way of example with reference to the accompanying drawings, through which like reference numerals are used to indicate similar features.

FIGS. 3A, 3B, 3C, 3D, 3E and 3F show, in diagrammatic form, a front view of an example of the resident video conference terminal of FIG. 2, with example graphical user interface screens thereon when no video conference session is active;

SUMMARY

Figure 1:
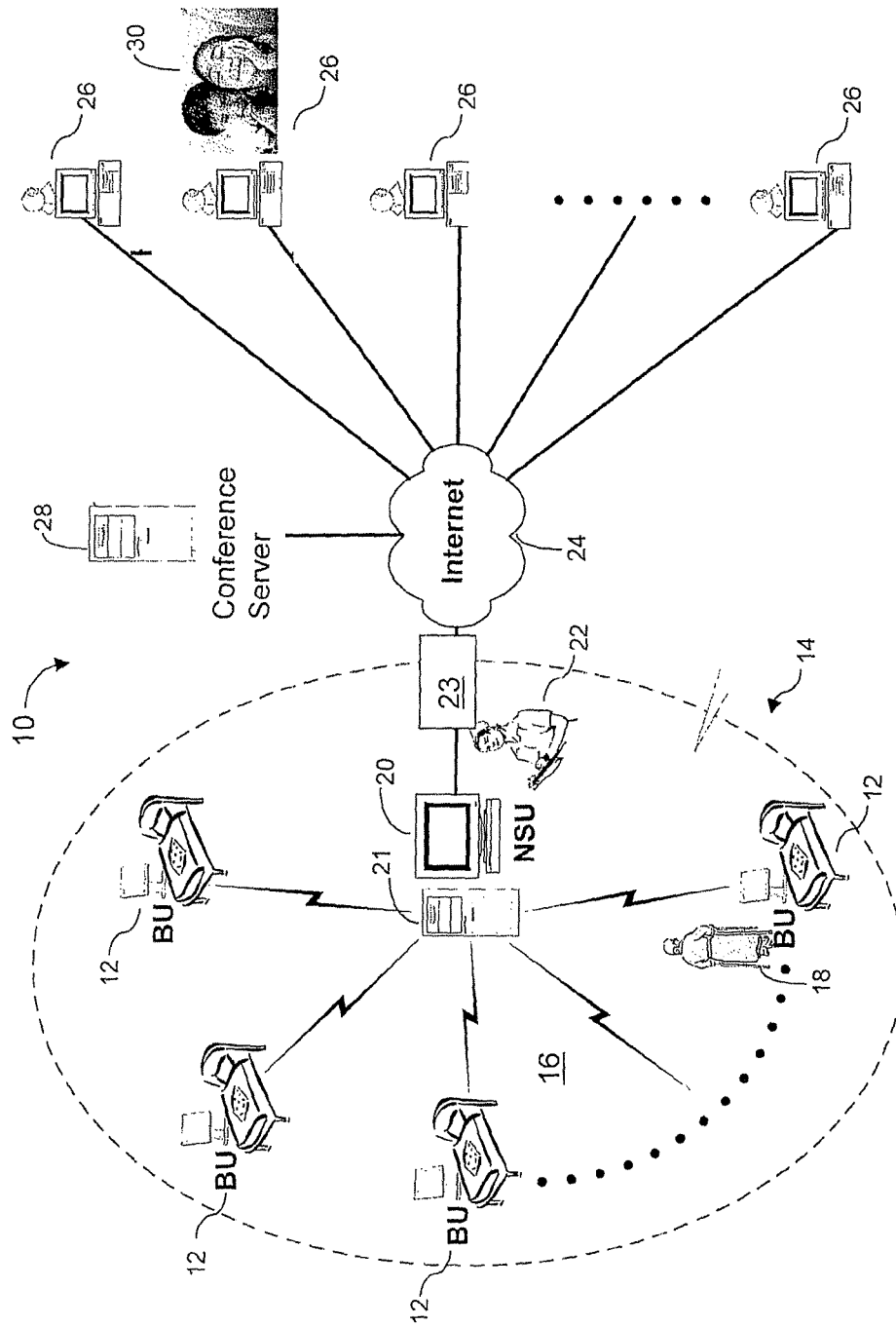
FIG. 1 shows a block diagram of an example of a communications system to which example embodiments can be applied.

According to one example embodiment of the invention is a resident video conference terminal for use by a resident of a facility, the resident terminal including: a controller for controlling the operation of the resident terminal; a touch screen display connected to the controller; a camera connected to the controller for capturing a video image of a user of the resident terminal during a video conference session; an audio transducer connected to the controller for capturing audio of a user of the resident terminal during a video conference session; an audio output connected to the controller; and a communications interface connected to the controller for exchanging signals with a communications network during a video conference session. The controller renders on the touch screen display a simplified user interface screen including a first user selectable button for initiating a video conference session with a monitoring station terminal within the facility and a second user selectable button for initiating a video conference session with at least one remote terminal that is external to the facility.

According to another example embodiment is a video conferencing system for facilitating communications between residents of a health care facility and remote users located outside of the health care facility. The system includes a plurality of resident terminals connected to a local area network within the health care facility, each resident terminal being associated with a resident of the health care facility and having stored thereon information identifying at least one remote user terminal located external to the local area network and that the resident terminal is associated with, each resident terminal being configured to display on a screen thereof a visual image that can be selected by a user thereof to initiate a video conference session with the at least one remote user terminal associated therewith. The system also includes a remote conference server located external to the health care facility and in communication with the plurality of resident terminals and the remote user terminals that are associated with the resident terminals, the conference server tracking usage information for video conference sessions that are established between the resident terminals and the remote user terminals associated therewith.

According to another example embodiment is a monitoring station video conference terminal for use by a care giver in a care facility in which a plurality of resident video conference terminals located with the care facility are assigned to the monitoring station terminal. The monitoring station includes: a controller for controlling the operation of the monitoring station terminal; a display connected to the controller; a camera connected to the controller for capturing a video image of a user of the monitoring station terminal during a video conference session; an audio transducer connected to the controller for capturing audio of a user of the monitoring station terminal during a video conference session; an audio output connected to the controller; and a communications interface connected to the controller for exchanging signals with a communications network during a video conference session. The controller is configured for selectively establishing, in response to user input, video conferences sessions with the resident terminals assigned thereto.

According to another example embodiment is a method of facilitating video conference sessions between residents of a care facility and remote parties who are outside of the care facility. The method includes providing resident terminals for use by residents of a care facility for video conference sessions, the resident terminals each having a user interface configured for use by a person having at least one of reduced cognitive abilities and reduced physical abilities; and assigning at least some of the resident terminals to specific residents of the care facility and storing at each resident video conference terminal assigned to a resident information identifying at least one remote terminal associated with the resident video conference terminal.

DETAILED DESCRIPTION

The terms "include" and "comprise" are used interchangeably within this document and are non-exhaustive when used, meaning, for example, that elements and items that are identified as including or comprising certain components or features can also include additional components or features that are not expressly identified.

System Overview

Reference is now made to FIG. 1, which shows a block diagram of a communications system 10 that in example embodiments facilitates 2-way video communication between patients/residents in a care facility, care providers within the facility, and other parties, such as family members and friends, who are remotely located relative to the care facility. The communications system 10 includes, within a care facility 14, a number of bed side units ("BU") or resident video conference terminals 12 and in some example embodiments at least one nursing station unit ("NSU") or central monitoring station video conference terminal 20. In some example embodiments, central monitoring station video conference terminal 20 may not be present. In an example embodiment, the resident terminals 12 and monitoring station terminal 20 within the care facility 14 are connected to and part of a common intranet, including for example at least one local area network ("LAN") 16. In example embodiments, the resident terminals 12 are enabled for wireless communication with network 16 through wireless access points located within the care facility 14. The communication system 10 also includes a number of remote video conference terminals 26 that are exterior of the health care facility 14 for use by family members or friends or other concerned parties to video conference with patients and care givers at the care facility 14. The remote terminals 26 are each connected to a wide area network (WAN) 24, which in an example embodiment includes the Internet. The LAN 16 is also connected, typically through a gateway server and firewall 23 to the WAN 24. In an example embodiment, a conference server 28 is also connected to the WAN 24 to facilitate communications between the remote terminals 26 and the patient and care provider terminals 12, 20 at the care facility 14.

The LAN 16 may be a computer network, typically covering a small local area such as single building of the care facility 14 or group of buildings that make up the care facility 14. The LAN 16 may be based on wired (such as switched Ethernet) and/or wireless technology (including for example technologies compliant with at least some of the family of IEEE 802.11 standards). The care facility 14 may be any suitable institution, and includes long-term care facilities, retirement homes, assisted living facilities, hospitals, and other institutional care facilities.

In operation, a patient 18, health care professional 22, or remote user 30 may wish to request a session between their respective video conference terminals (resident terminals 12, central monitoring station terminal 20, and remote terminal 26, respectively). By way of example, a patient 18 may operate a resident video conference terminal 12 located at the patient's bedside. The patient 18 may initiate a session request on the resident video conference terminal 12 with another terminal, for example monitoring station terminal 20, which is used as a health care provider terminal. A health care professional 22, such as a nurse, doctor, technician, or assistant, may use the health care provider central monitoring station video conference terminal 20 to accept the session request by the patient terminal 12, resulting in a video conference session being established over the LAN 16 between the resident video conference terminal 12 and the monitoring station video conference terminal 20 located at the health care facility 14.

By way of another example, a remote user 30, such as a family member, friend or other third party, may initiate a session request on the remote video conference terminal 26 with another terminal, for example a resident video conference terminal 12. The patient 18 may then use the resident video conference terminal 12 to accept the session request from the remote video conference terminal 26, such that a video conference session is established over the WAN 24 and LAN 16 between the remote video conference terminal 26 and the resident video conference terminal 12. By way of yet another example, a video conference session may be similarly established between the monitoring station video conference terminal 20 and the remote video conference terminal 26.

It can be appreciated that a three-way network session (or a network session between a multiplicity of video conference terminals) may also be created between the resident video conference terminal 12, central monitoring station video conference terminal 20, and remote video conference terminal 26.

In example embodiments, conference server 28 may act as both a connection manager module and directory service module to facilitate network sessions between the video conference terminals 12, 20, 26, to facilitate the customer settings and administration of the network sessions, and to facilitate user registration and billing.

Now that an overview of communications system 10 has been provided, aspects of the system will now be described in greater detail.

Resident Terminal

Reference is now made to FIGS. 2 to 11, which show illustrative embodiments of the resident video conference terminal 12 for use by a patient 18. The resident terminal 12 is in at least some example embodiments configured to allow a patient with limited or reduced cognitive and physical abilities to participate in video conference communications with care givers at the care facility 14, and concerned persons (such as family) at remote terminals 26.

Figure 2:
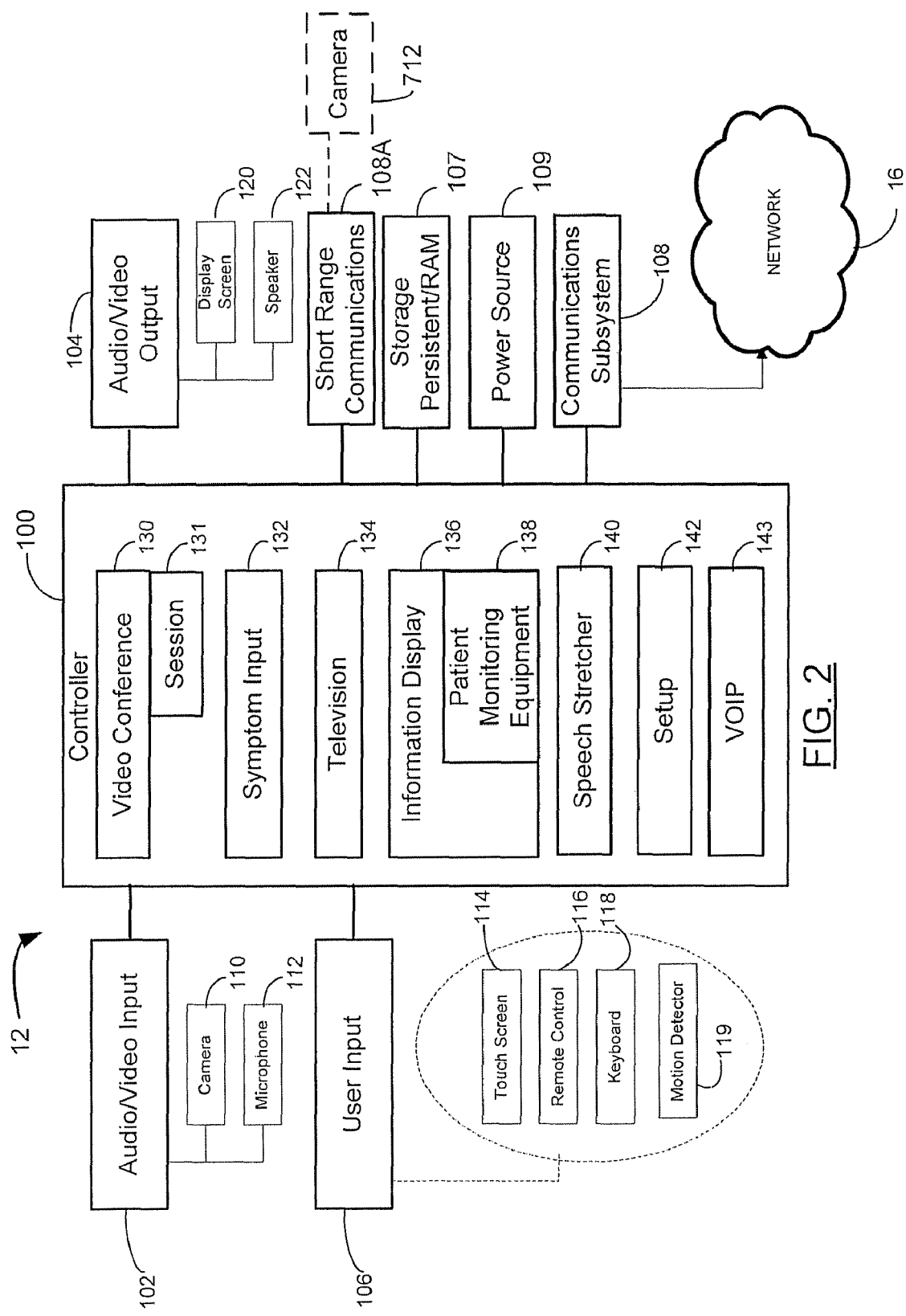
FIG. 2 shows a block diagram of a resident video conference terminal to be used on the communications system shown in FIG. 1.

FIG. 2 shows an illustrative block diagram of an example resident video conference terminal 12 to be used on the communications system 10. As shown in FIG. 2, the resident video conference terminal 12 has a controller 100 for controlling operation of the resident video conference terminal 12, an audio/video input 102 and an audio/video output 104 coupled to the controller, a user input 106, and a wireless communications subsystem 108 coupled to the controller 100 for sending and receiving communications information over a wireless connection to LAN 16. In an example embodiment, each resident terminal 12 is configured to communicate with the Internet 24 through LAN network 16. Terminal 12 also includes electronic storage 107, which is coupled to the controller 100 and can include transient memory such as RAM and one or more persistent storage elements such as, but not limited to, flash memory or a hard drive. The controller 100 can include one or more microprocessors that are coupled to the persistent and/or transient memory of storage 107. Storage 107 stores information and software enabling the microprocessor(s) of controller 100 to implement the resident terminal functionality described below. In an example embodiment, the resident terminal 12 includes a rechargeable power source 109 for powering terminal 12.

The audio/video input 102 may be a microphone 112 and camera 110, respectively. The audio/video output 104 may be a speaker 122 and a display screen 120, respectively. As shown, suitable options for the user input 106 may be a touch screen 114, a remote control 116, or a keyboard 118.

Referring to FIG. 3A, in an example embodiment, the resident terminal 12 is packaged as a self-contained mobile, compact tablet-style console 160 that is ergonomically configured to be easily picked up, moved about, and used by a patient 18 who may have impaired physical functions and/or limited cognitive abilities. In some example embodiments, the resident terminal 12 can be mounted to a hospital-style rolling bedside table, or mounted on a swing arm such as those used for hospital televisions, so that it can be positioned for use by the patient 18. By way of non-limiting example, in terms of external dimensions, the console 160 can in at least some example embodiments, have a depth (i.e. going into the page in FIG. 3) of between 2 to 5 inches, a height "H" of between 6 to 9 inches and a width W of between 7 to 10 inches, although other dimensions are also possible. A charging station (not shown) can be located in the patient's room for charging the power source 109 when, for example, the resident terminal 12 is not in use.

As shown in FIG. 3A, the resident video conference terminal 12 includes integrated user interface components including display screen 120, camera 110, speaker 122 and microphone 112 (a headset can be used in some example embodiments). In the illustrated example embodiment, the display screen 120 is a touch screen 114.

Referring again to FIG. 2, there are a number of modules of the controller 100 that may perform desired functions on the resident video conference terminal 12. In one example embodiment, the modules on controller 100 are implemented by software applications running on a processor of the controller 100, the executable code for such applications being stored on storage 107. As shown, the controller 100 has a video conference module 130, a symptom input module 132, a television module 134, an information display module 136, a speech stretcher module 140 and a setup module 142. The video conference module 130 includes a session module 131. In various embodiments, additional or fewer modules may be implemented by controller 100, and some or all of the functions performed by some modules could be combined into other modules or split into separate modules. In some example embodiments, rather than having all the code for the modules present on each resident terminal 12, at least some of the modules shown in FIG. 2 could be at least partially hosted on a device other than the resident terminal 12, such as on a resident server 21, a central monitoring station 20, or a Web-accessible server such as conference server 28, with the resident terminal calling on the remotely located modules in a client-server fashion.

In example embodiments, a patient or resident 18 may operate the resident video conference terminal 12 to initiate or accept video conference sessions with another video conference terminal (including, for example, monitoring station terminal and/or a remote terminal 26) by manipulating the user input 106, which in the illustrated embodiment of FIGS. 3-11 takes the form of an LCD touch screen 114 which performs the dual role of a display screen 120 and a user input 116. In an example embodiment, the resident terminal 12 is preconfigured for a specific resident, and in this regard information is stored on the resident terminal 12 that identifies one or more remote terminals 26 that are associated with one or more remote users 30 that the resident 12 is authorized to establish video conference sessions with. The stored information in at least some example embodiments includes for each authorized remote terminal 26, a picture of and name of the remote user(s) 30 associated with the remote terminal 26.

The video conference module 130 performs a video conferencing as follows. FIG. 3A shows an example of a default home or idle graphical user interface 162 on the display screen 120 with three video conference options shown as user selectable icons or buttons: a call nurse button 150; a call family button 152; and an end call button 154. In one example embodiment, the display screen 120 will be blank or have reduced back lighting in a power saving mode when no user interaction with the terminal 12 has occurred within a predetermined time period. The terminal 12 can be brought out of power saving mode to display the default idle interface 162 in response to a user input, for example a user touching any portion of the screen 114. In some example embodiments, the terminal 12 may be equipped with a motion switch or motion detector 119 (FIG. 2), such that motion of the console 160 (for example, if the console is picked up) causes the controller 100 to exit power saving mode and display default interface 162. Thus, in such an embodiment, the default interface 162 can be easily displayed by a patient having limited physical or cognitive abilities. The terminal 12 can also be brought out of a power saving or standby mode to display an incoming session request interface (described below) when an incoming session request is received by the terminal 12.

In the illustrated embodiment of FIG. 3A, when the terminal 12 is in an idle mode and not currently involved in a video conference session, the patient is presented with only two active options to select—the "Call Nurse" button 150 and the "Call Family" button 152, which are presented with light lettering (for example white) and bright backgrounds to provide a visual indication that such options are available for selection; the "End Call" button 154 is presented in interface 162 with faded or darker lettering and/or a faded or darker background to provide a visual indication that the "end call" option is not currently available for selection. In an alternative example embodiment, the "end call" button 154 is not displayed at all in the interface 162 when it is not an available option. As shown in FIG. 3A, the default interface 162 includes a large portion 155 that displays nothing, except perhaps a time at a bottom portion of it. However, in some example embodiments, screen area 155 can be configured to display, while in idle mode, information and/or pictures for the patient. For example, a schedule of events organized for the day for the residents of the care facility could be presented in area 155 of the default interface 162. In this regard, FIG. 3D shows an example embodiment in which a daily schedule 163 for the resident user 18 is presented in the area 155 of the default idle interface screen 162. Daily menu information could alternatively or additionally be shown in the area 155. Such information could be customized for the particular resident that the terminal 12 has been assigned to. For example, a general program schedule for the facility 14 can be stored at the central monitoring station 21 or central server 20, or remotely at an external server, and periodically sent to the resident terminal 12 with appropriate filtering being applied (either at the terminal 12 itself or at a server from which the scheduling data is retrieved) according to predetermined activity preferences for the resident. Alternatively (or additionally) a picture (for example of family, a pet, etc.) provided by or on behalf of the resident could loaded onto the terminal 12 and then displayed in area 155 of the default interface 162.

In an example embodiment, the option buttons 150, 152 and 154 are displayed with different colour backgrounds to help distinguish them from each other, such as green, blue and red, respectively. As illustrated, the option buttons 150, 152 and 154 are positioned in a column at a right side portion of the touch screen 114, however they could be displayed in other configurations as well. In some embodiments, option button location and/or size can be a configurable setting of the terminal 12. For example, if it is known that a left handed patient will be using the terminal, the controller 100 can be pre-configured to locate the column or option buttons 150, 152 and 154 along the left hand side of the screen 114.

The option buttons 150, 152 and 154 are in example embodiments presented as sufficiently large portions of touch screen 115 that they can easily be seen and pressed by a patient using the device, while at the same time minimizing accidental selections. In one example embodiment, the display area of touch screen 114 is between 4 and 6 inches high and between 6 and 8 inches wide, and each option button is between 1.5 and 2 inches high and between 1.5 and 2 inches wide, however other configurations can be used in other embodiments. Presenting a patient with a limited number of selectable touch screen buttons (in the illustrated embodiment, only two selectable buttons are shown in idle mode: the "Call Nurse" button 150 and "Call Family" button 152) from the default interface screen 160 provides an easy to use, relatively error proof interface. Although the buttons have been shown in the Figures labeled as "Call Family" and "Call Nurse", other labels could be assigned to the option buttons as appropriate.

As mentioned above, when a resident terminal 12 is assigned to a resident, the terminal will typically be preconfigured for the specific resident to which it is being assigned. Such pre configuration may occur in a number of ways—for example, the terminal 12 could include port (for example a USB port or an Ethernet jack that allows it to be connected to a configuring device or network), or could include an on-board configuration interface screen, or could be configured through signals received from LAN 16 through wireless communications system 108. In some embodiments, configuration information can be received from conference server 28 via Internet 24 and LAN 16. Configuration or set-up can include for example specifying the on-screen button location and size, and the language to use on the labels for the buttons, loading up pictures to be used in the various interfaces, and associating specific identifying information with the "Call Family" option such that pressing the call family button will initiate a video conference session with the correct remote terminal 26.

Figure 3B:
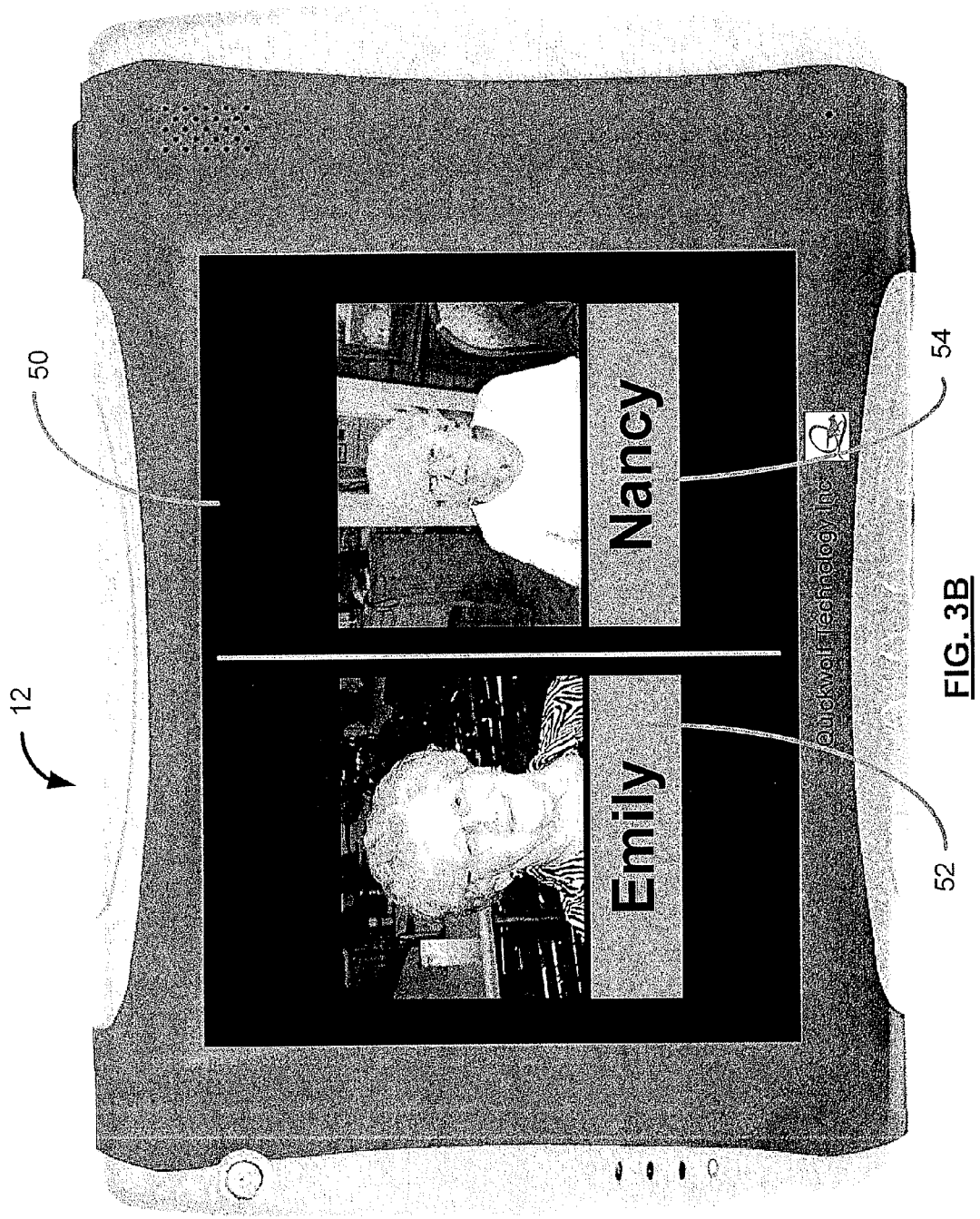
Figure 3C:
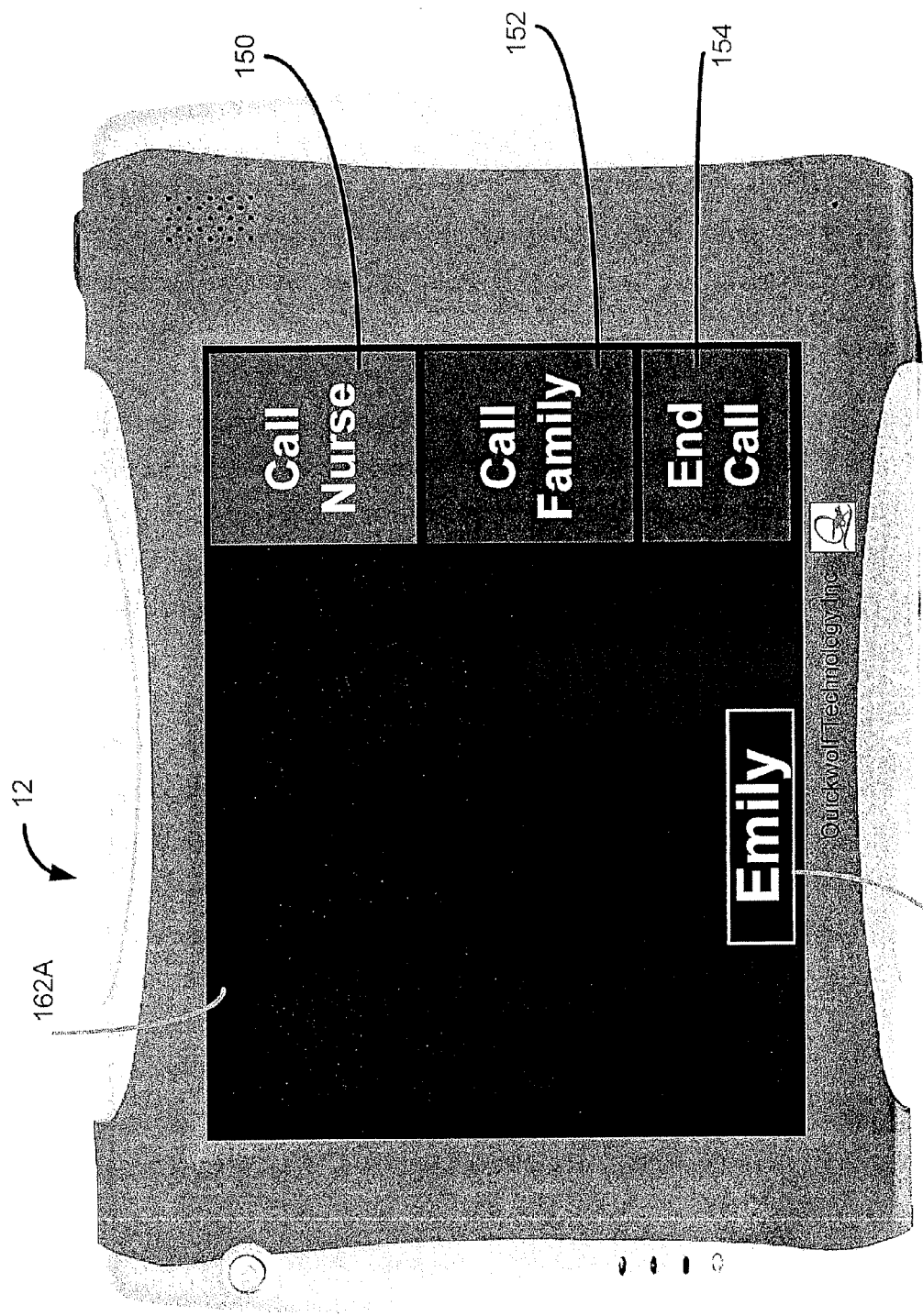
Figure 3D:
Figure 3E:
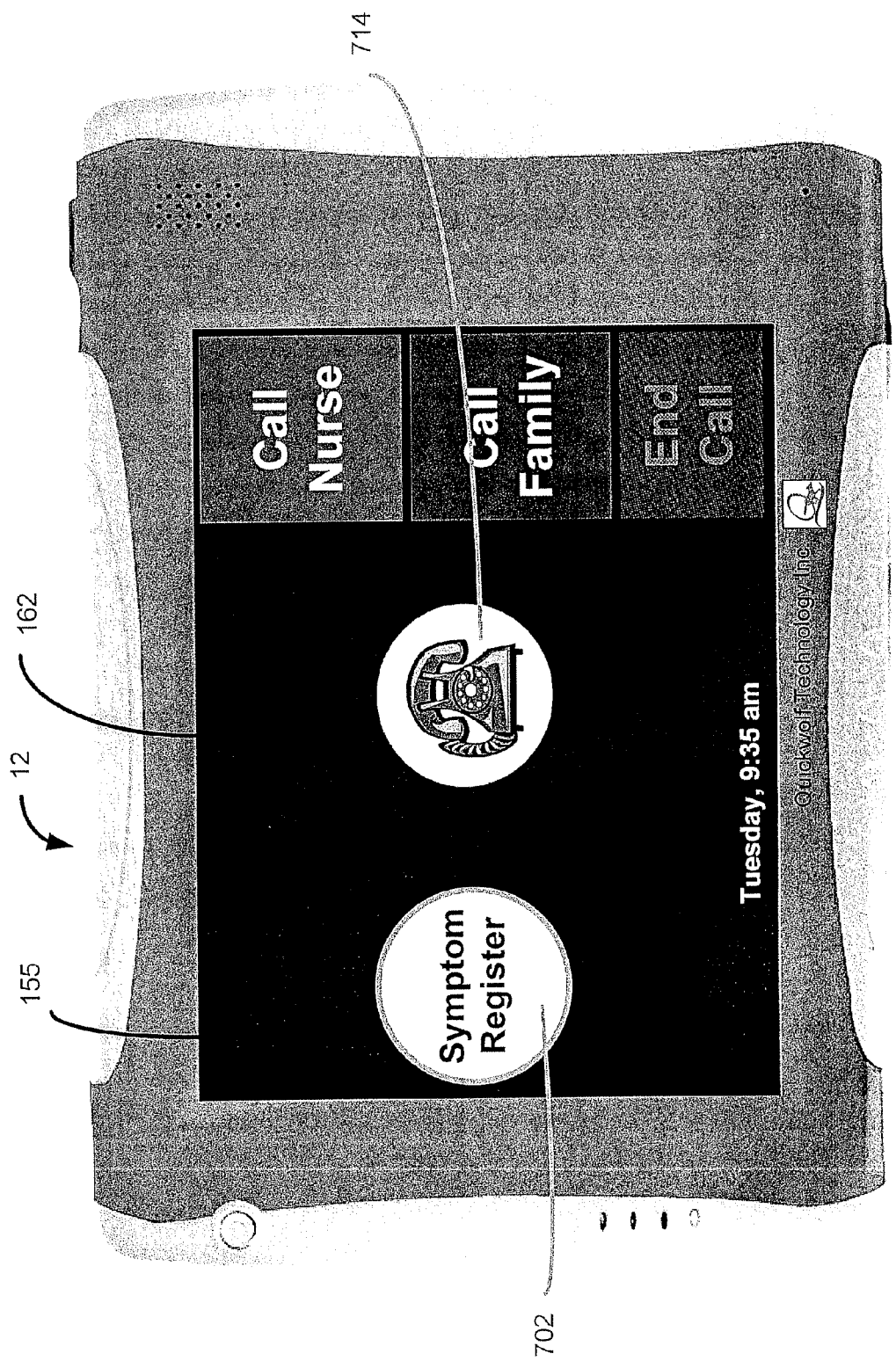
Figure 3F:
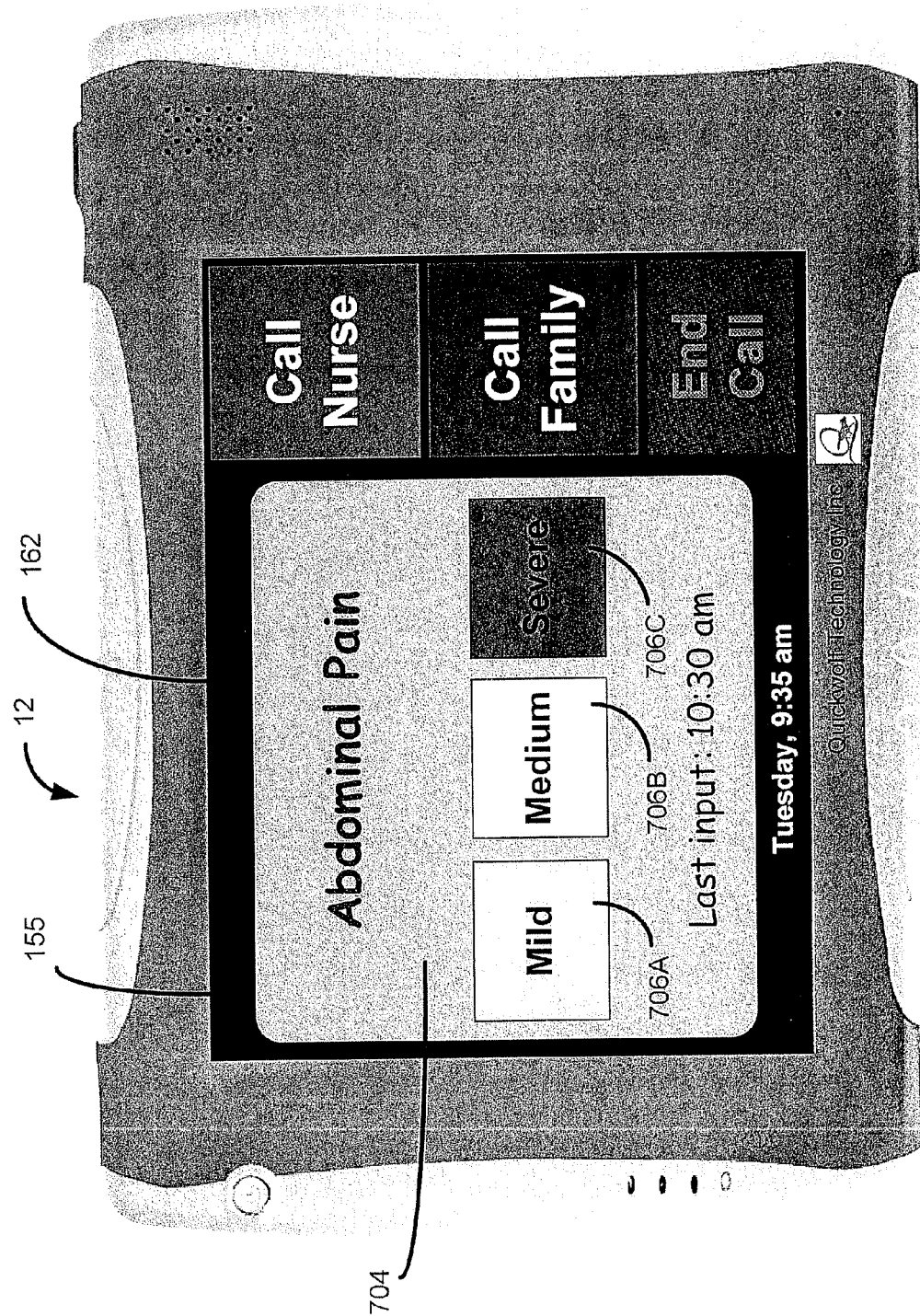
Figure 4:
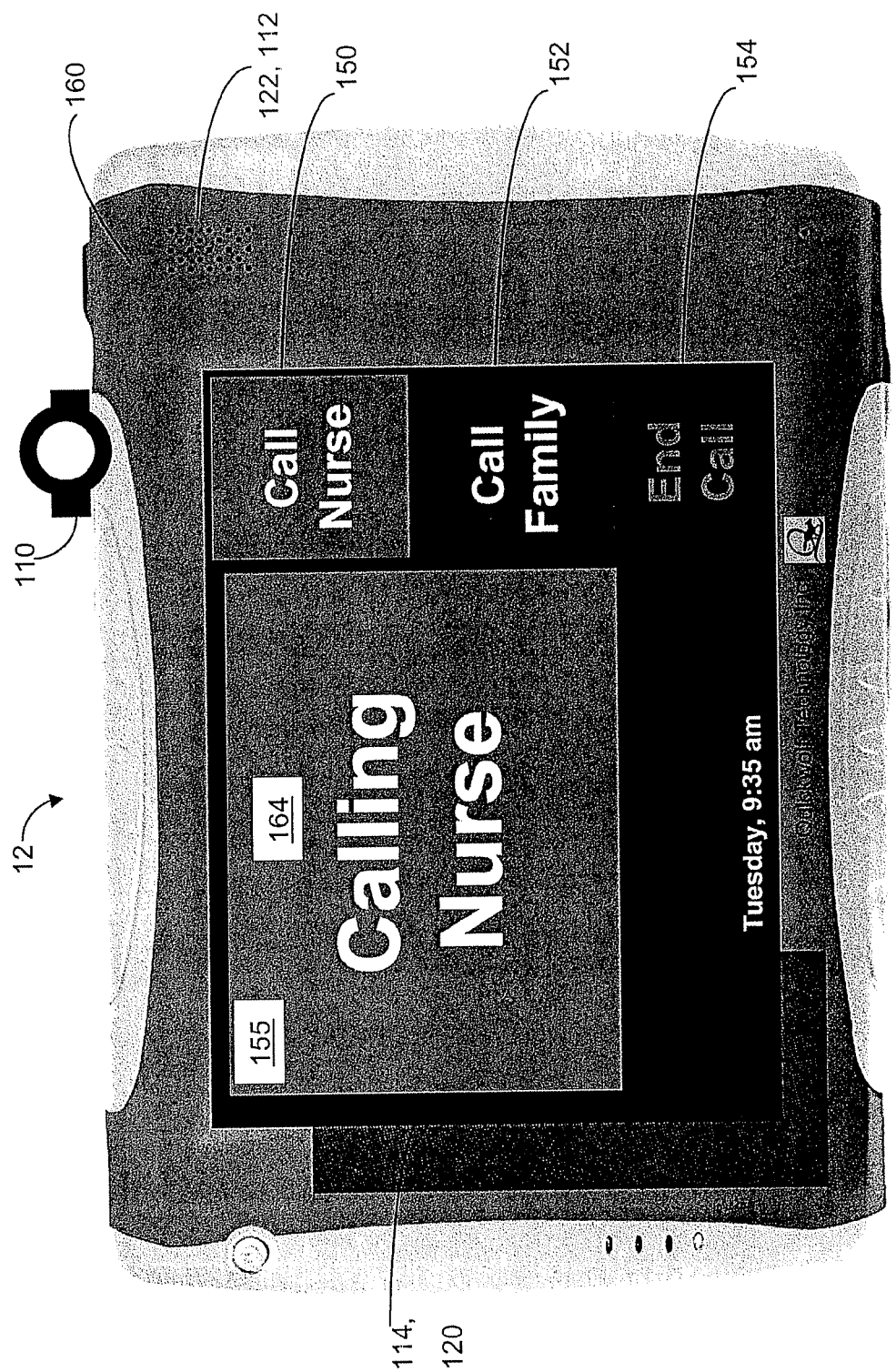
FIG. 4 shows a diagrammatic view of an example graphical user interface for the resident video conference terminal of FIG. 2, while a session request is sent to a monitoring station terminal.
Figure 5:
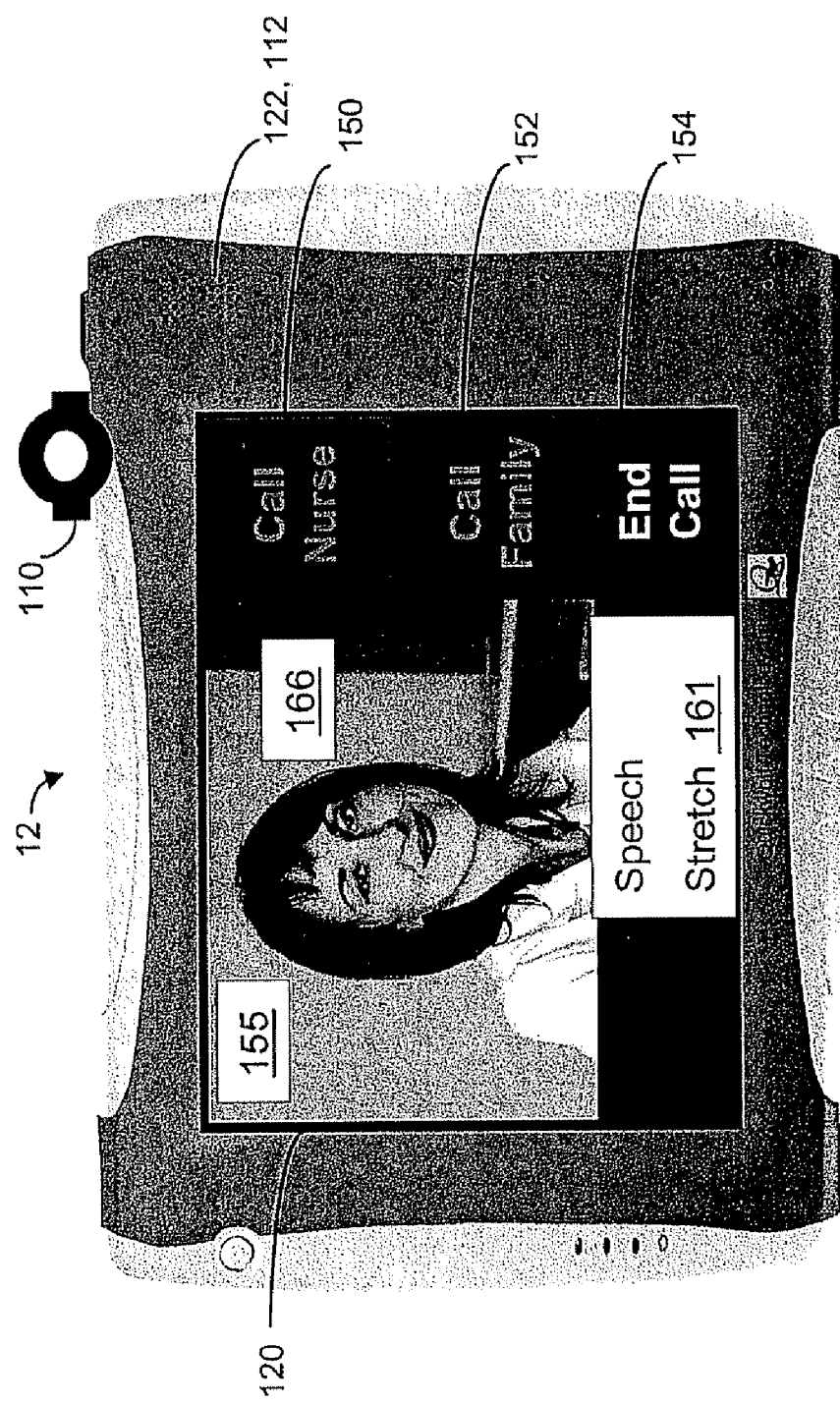
FIG. 5 shows a diagrammatic view of a graphical user interface for the resident video conference terminal of FIG. 2 after a session with a monitoring station terminal has been established.

Reference is now made to FIGS. 3, 4, and 5 which illustrate how a patient/resident 18 may initiate a video conference session request from the resident video conference terminal 12 with the monitoring station video conference terminal 20. If the patient 18 wishes to contact monitoring station video conference terminal 20 (for example to talk to a nurse at the nursing station), the patient 18 selects the "Call Nurse" button 150 by pressing it on touch screen 114. Once the "Call Nurse" button 150 has been pressed, the resident terminal 12 transmits a video conference session request through wireless communications subsystem 108 and network 16 to the monitoring station terminal 20. Referring to FIG. 4, while the session is being established, a graphical user interface 164 is displayed on screen 114 that indicates, in large letters: "Calling Nurse" in screen area 155. The "Call Nurse" button 150 and "Call Family" button 152 are each displayed with faded letters and background (compared to default interface 162) to provide a visual indication that they are currently unavailable. The "End Call" button 154 is shown with bright letters and background to provide a visual indication that it is currently available as an option for the resident to select. Assuming that the nurse at monitoring station terminal 20 decides to accept the video conference request, a video conference session will be established over network 16 between the resident terminal 12 and the monitoring station terminal 20. Thus, in the above described example, the resident only has to select a single on screen button ("Call Nurse") from the idle screen to cause a video conference session to be established with the monitoring terminal 20.

FIG. 5 illustrates a graphical user interface 166 displayed on screen 114 of the resident terminal 12 when a video conference session is established between it (through communications subsystem 28 and network 16) and the monitoring station terminal 20. The call nurse button 150 becomes a faded call nurse button 150, which means that the button is no longer an available option to the patient 18. Similarly, the call family button 152 becomes faded. The end call button 154 is brightly displayed as it is a selectable option. During the video conference session, a substantially real time video stream of the nurse (or other party) 22 will appear in area 155 of the resident terminal display screen 120, and substantially real time audio of the nurse 22 will be output from the speaker 122. A video of the patient 18 will be captured by the camera 110 and an audio of the patient will be captured by the microphone 112 for sending through the network 16 to the monitoring station terminal 20, enabling an interactive, two-way video conference session to be held. The patient can end or terminate the session by pressing the end call button 154.

Tuning again to FIG. 4, in the event that after a predetermined duration of time the health care professional stationed at the monitoring station terminal 20 does not respond to the incoming video conference request, or indicates through an input to the monitoring station terminal 20 that he or she does not want to take the call, then a message such as "Nurse Unavailable Now" or "Nurse Will Return" can be generated in the area 155 of interface screen 164.

Turning again to FIG. 3A, if the patient 18 wishes to initiate a video conference session with a remote user 30, such as a family member, the patient 18 can press the "Call Family" button 152. In the illustrated embodiment, the resident terminal 12 has been pre-associated with two possible remote parties, such that pressing the "Call Family" button 152 links, with reference to FIG. 6, to a user interface 168 having two call family buttons "Rick" 156 and "Judy" 158. In the illustrated embodiment, the resident terminal 12 has been preconfigured to display in user interface 168 as a user selectable button 156 a photo of "Rick" and his family along with the identifying name "Rick" within a border 170, and to display as user selectable button 158 a photo of "Judy" along with the identifying name "Rick" within a border 172. Pressing the touch screen 114 within the border 170 signals to the video conference module 130 acceptance of the call "Rick" option; pressing the touch screen 114 within the border 172 170 signals to the video conference module 130 acceptance of the call "Judy" option. Configuring the resident terminal to prominently display recognizable pictures and names for touch screen selection can provide a simple-to-use interface for residents of limited abilities.

Figure 6:
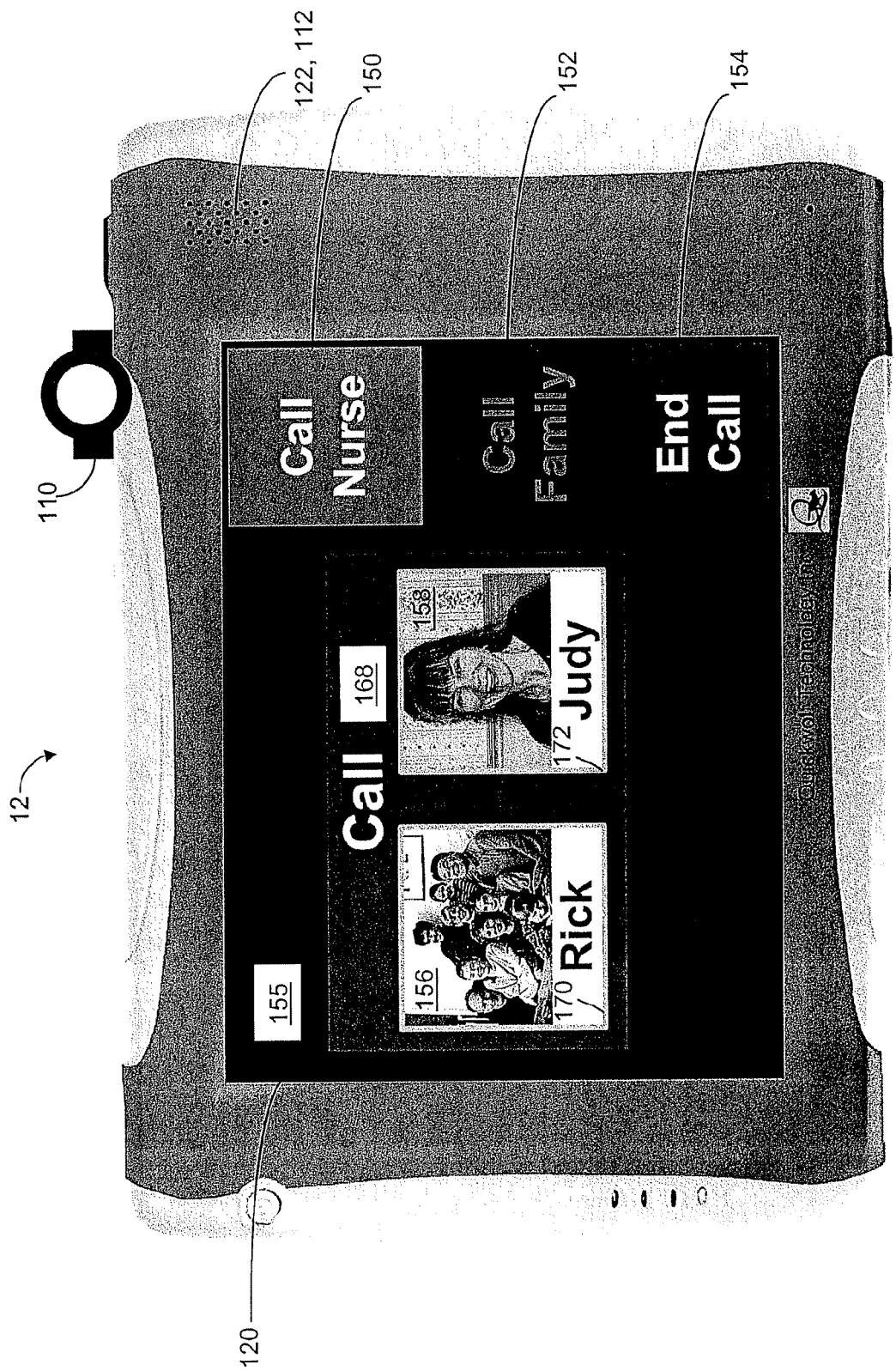
FIG. 6 shows a diagrammatic view of a graphical user interface on the resident video conference terminal of FIG. 2 that is displayed in response to pressing of a "call family" button.
Figure 22:
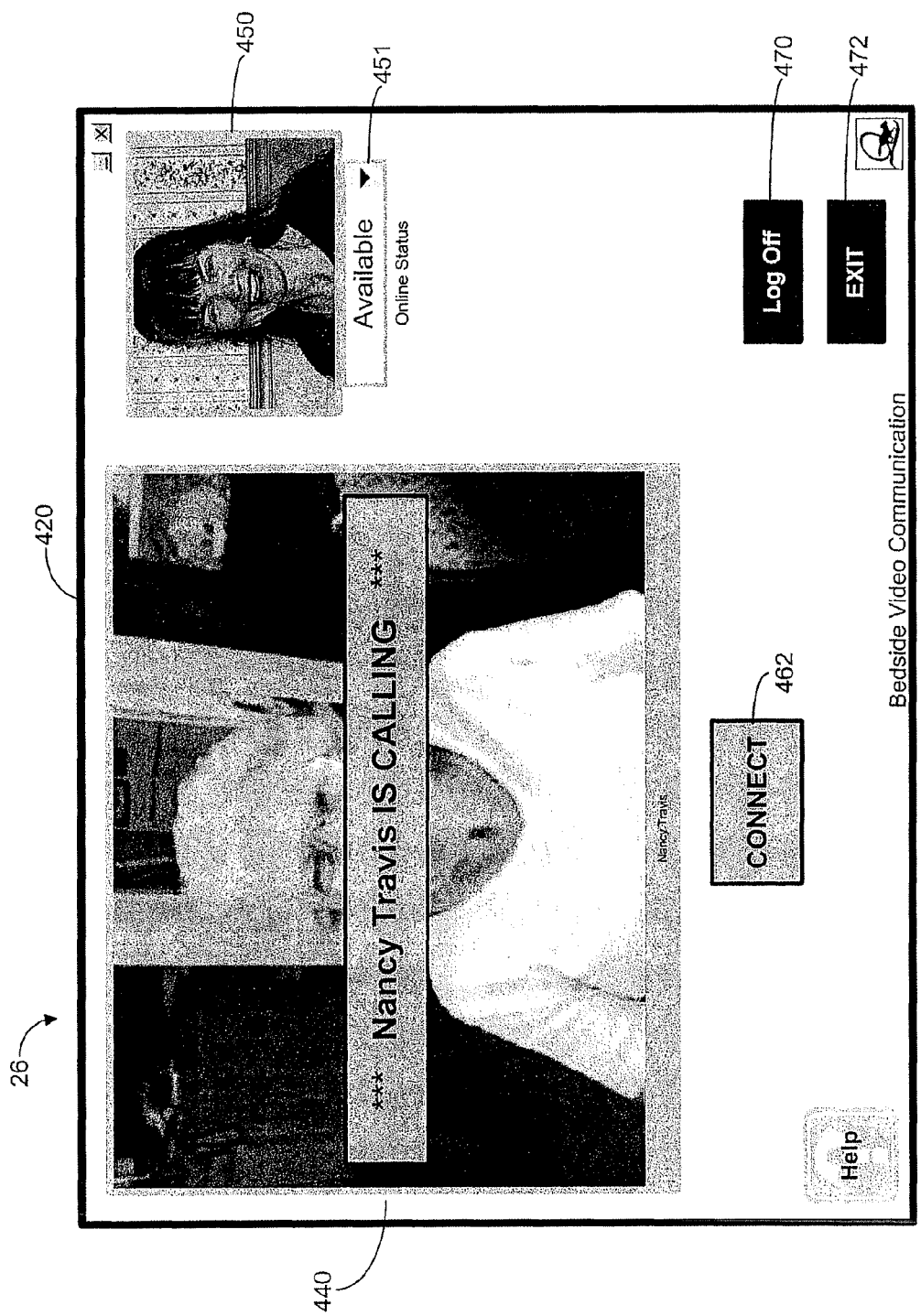
FIG. 22 shows a diagrammatic view of an example graphical user interface for an incoming session request from a resident terminal for the remote video conference terminal of FIG. 12.

As shown in FIG. 6, the "Call Family" button 152 is faded so to provide visual feedback that such option is not currently available from interface screen 168. The patient 18 may then select one of the call family buttons (156, 158) by touching the screen in the appropriate place to initiate a video conference session request with the appropriate remote user 30 (Rick or Judy) that is associated with the selected button. As will be explained in greater detail below, this causes the session module 131 to initiate a session request through conference server 28 with the appropriate remote video conference terminal 26. While the session is in the process of being initiated, the display screen may look similar to that shown in FIG. 4, with the message "calling Rick" or "calling Judy" replacing the message "Calling Nurse". Turning briefly to the remote terminal 26, a remote user 30 will then be able to see the session request by way of display screen 440, as shown in FIG. 22. The remote user 30 may accept the session request by selecting the connect icon 462, thereby initiating the network session.

Figure 5A:
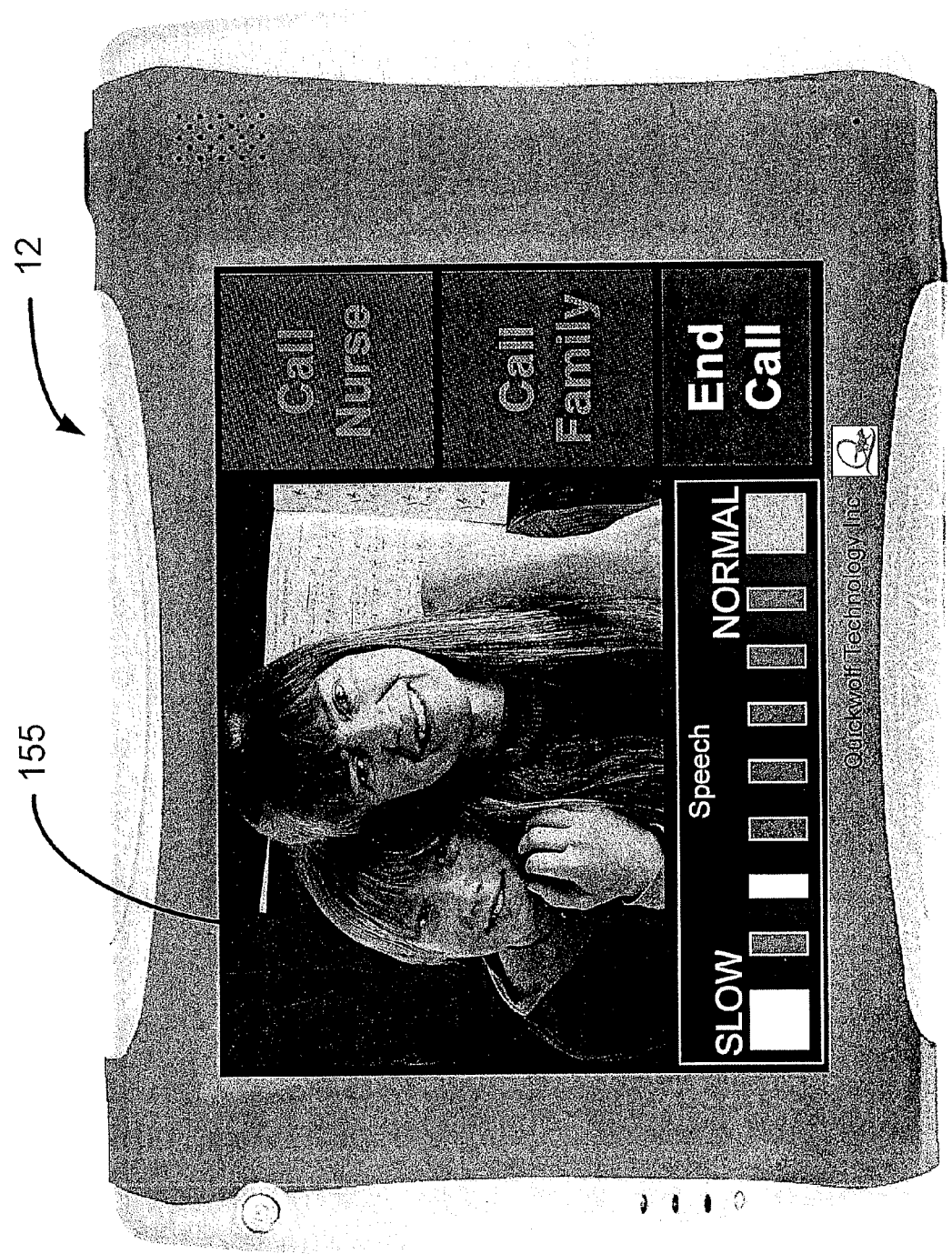
FIG. 5A shows a diagrammatic view of a graphical user interface for the resident video conference terminal of FIG. 2 after a session with a remote terminal has been established.

If a video conference session is successfully established with the remote user 30, then substantially real-time audio and video will be exchanged between the resident terminal 12 and the remote terminal 26 of the remote user 30 via LAN 16 and Internet 24, with the user interface screen on resident terminal 12 being similar to that shown in FIG. 5. In this regard, FIG. 5A illustrates a possible video conference user interface on resident terminal 12 when a video conference session with a remote terminal 26 is active. Thus, in the above described example, a resident need only make two on-screen selections to cause a video conference session to be established with a family member, namely selection of the "Call Family" button 152, followed by selection of the button representing the particular family member that the resident wants to call.

Although the "Call Family" button 152 is shown in the illustrated embodiment as linking to an interface screen 168 (FIG. 6) having two possible family or friend calling options, more than or fewer than two possible remote user calling options could be provided. In the case of just a single remote user calling option, the user interface screen 168 can be optionally omitted, with activation of the "Call Family" button 152 immediately causing a session request to be initiated by the resident terminal 12.

Turning again to FIG. 3A, in one example embodiment, if the care provider or monitoring station video conference terminal 20 is currently unavailable for a video conference session, the call nurse icon 150 becomes faded to convey that information. Similarly, if the subject remote video conference terminal 26 is currently unavailable, the call family icon 152 becomes faded to convey information about its unavailability.

Turning to FIG. 6, in the case where the resident terminal 12 has been preconfigured to present multiple family or friends calling options, the selectable call buttons or icons 156, 158 may also be visually coded to indicate if the remote parties are currently on-line or logged in with the conference server 28, and thus available to accept an incoming session request from the remote terminal 12. For example, if the remote terminal(s) 26 associated with "Rick" is currently unavailable for a video-conference session than the button 156 may be displayed with muted colors or faded relative to how the thumbnail image 156 would be displayed if a remote terminal(s) 26 associated with "Rick" was currently available.

In some example embodiments, a single resident terminal 12 may be preconfigured for shared use by multiple residents, and in this regard FIG. 3B illustrates another possible "idle" user interface screen 50 which can be substituted in place of the user interface 176 of FIG. 3A. The user interface screen of FIG. 3B shows an example where the terminal 12 is preconfigured to be shared by two residents "Nancy" and "Emily", although it will be appreciated that the terminal 12 could be configured for sharing by more than two residents. In the idle mode interface screen 50, user selectable areas or buttons 52 and 54 associated with the respective resident users of the terminal 12 are presented side by side on the touch-screen. In the illustrated embodiment, each selectable button 52, 54 includes the picture and name of the subject resident, to facilitate selection of the correct button by the appropriate resident. User selection of either the button 52 or 54 links to a user interface screen 162 for the subject resident that is similar to that shown in FIG. 3A. For example, FIG. 3C shows an example interface screen 162A that is displayed after selection of the "Emily" button 52. Identifying information (for example the name "Emily" in block 56) can be shown on the interface 162A to identify the current user of the terminal 12. As with user interface screen 162 of FIG. 3A, the user interface screen 162A includes a touch-screen "Call Nurse" button 150, "Call Family" button 152 and "End Call" button 154 which operate in a manner similar to the buttons described above in respect of interface screen 162. For example, the terminal 12 is preconfigured so that selecting the "Call Family" button 52 will present the calling interface 168 (see FIG. 6) for calling Emily's family members. In one example embodiment, the "End Call" button can be selected from interface 162A to return to the idle screen 50.

Figure 7:
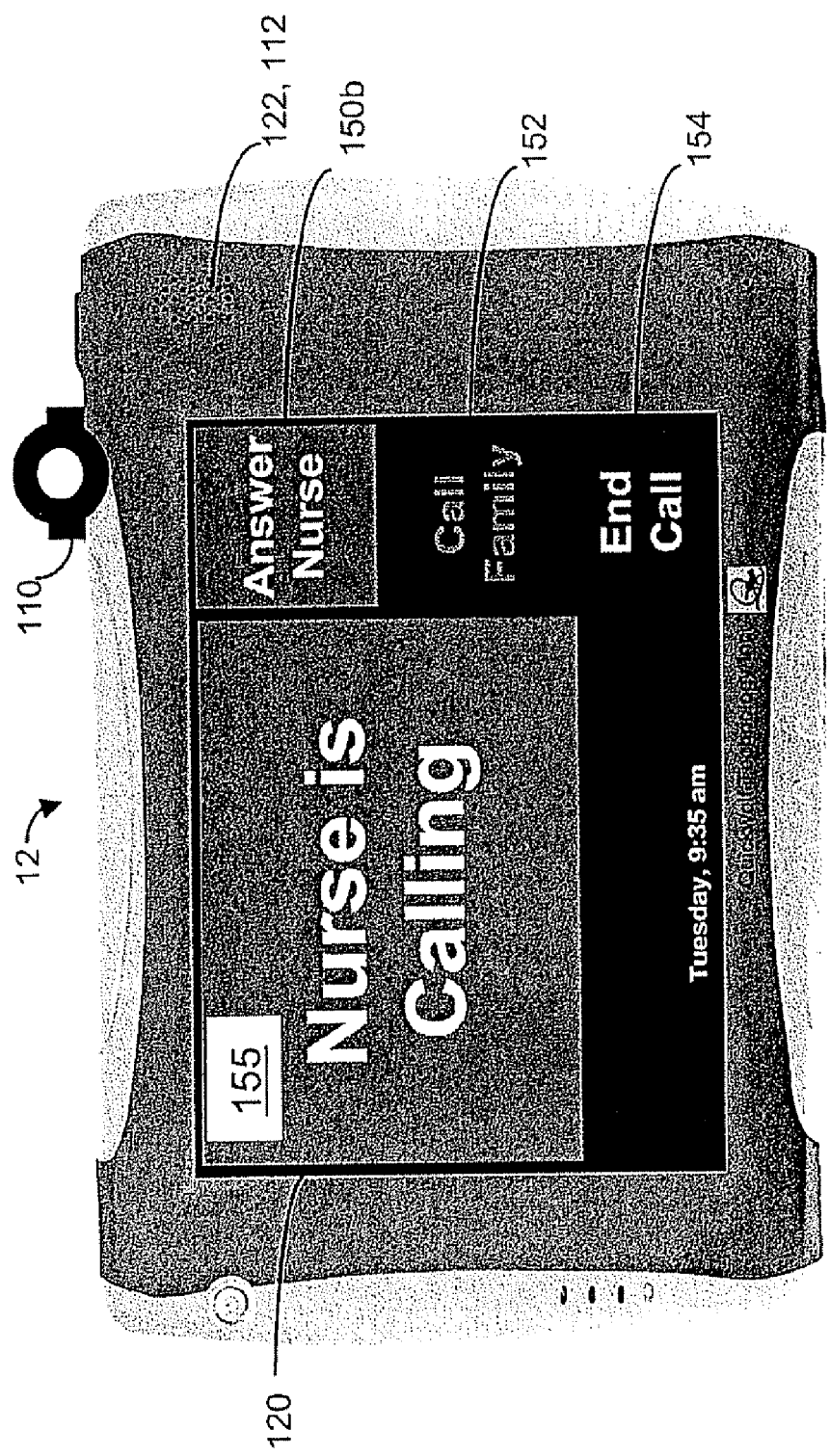
FIG. 7 is a diagrammatic view of an interface screen for the resident video conference terminal of FIG. 2, when a video conference session request is incoming.

Referring now to FIG. 7, the resident terminal patient 18 may also accept a session request from another video conference terminal. FIG. 7 illustrates screen 120 when an incoming video conference session request is received from the monitoring station video conference terminal 20. The phrase "Nurse is Calling" is displayed on the display screen 120. The call nurse button (150 in FIG. 3) is changed to answer nurse button 150b. If the patient 18 wishes to accept the session request, the patient 18 selects the answer nurse button 150b. A video conference session will then be established between the resident video conference terminal 12 and with the monitoring station video conference terminal 20. Similarly, in example embodiments when an incoming conference requests from a remote terminal 26 is received at resident terminal 12, a message such as "Family is Calling" can be prominently displayed in screen area 155, and the "Call Family" button 152 replaced with an "Answer Family" button that can be touched to accept the call and establish a video conference session.

Figure 8:
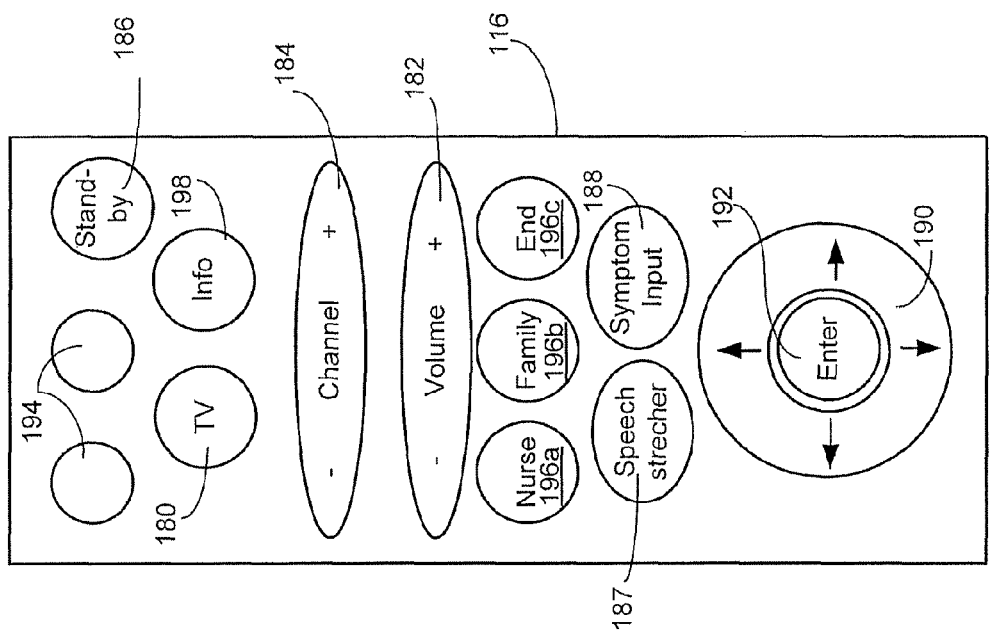
FIG. 8 is an illustrative front view of a remote control for use with the resident terminal of FIG. 2.

Other features of resident terminal 12 will now be explained in greater detail. In at least some example embodiments, the resident terminal 12 includes a further user input device in addition to a touch screen, such as, for example, a short range wireless hand held remote control 116, as shown in FIG. 8. In at least some example embodiments, the remote control 116 is equipped with oversize "elder friendly" buttons and allows a resident user to access additional or other features of the resident terminal 12 that are not easily accessible through the touch screen buttons 150, 153, 154 of default interface 162.

For example, in an example embodiment, pressing a "Symptom Input" button 188 on remote control 116 allows a user to access the symptom input module 132 (see FIG. 2) and allows a patient 18 to enter health information for future reference, such as for a health care user 22. With reference to FIG. 3E, in at least one example embodiment, a user selectable "Symptom Register" button 702 may be presented on the touch screen of resident terminal 12, for example in the area 155 of the idle mode interface screen 162, as an alternative to a "Symptom Input" button on the remote control 116. Upon selection of either the remote control "Symptom Input" button 188 or the touchscreen "Symptom Register" button 702, the symptom input module 132 will display a menu of possible symptoms on the display screen 120. The patient 18 may then select a symptom, for example using touch screen 114 (or a navigation/selection key combination 190, 192 on remote control 116) to record incidences of pain, dizziness, or other symptoms as well as severity. This information may then be sent by the communications subsystem 108 to the monitoring station video conference terminal 20, for diagnosis by a health care user 22. By way of example, with reference to FIG. 3F, in one example embodiment the resident terminal 12 is preconfigured during setup for its assigned resident, or a subsequent update, to present a series of symptom input screens that correspond to the type of ailment(s) that the resident assigned to the terminal 12 suffers from. FIG. 3F shows an example of one such symptom user input interface 704 displayed in the area 155 of idle mode screen 162 after a user has selected either the remote control "Symptom Input" button 188 or the touchscreen "Symptom Register" button 702. The input interface 704, which prompts a user to select one of three possible touch screen buttons "Mild" 706A, "Medium" 706B and "Severe" 706C (which may be color coded) to describe "Abdominal Pain" can be a stand-alone input screen or one in a series of symptom input screens that are presented sequentially to the resident user. The input information, and its entry time, can be stored at the remote terminal 12 and/or transmitted to a facility server 21, a central monitoring station 20, and/or a remote web-based server 28, for further analysis by a health care provider in near real time or at a later time. In some embodiments, the resident terminal 12 may be configured to or cause to periodically prompt the resident, for example through audible or visual alerts, to enter the symptom information at predetermined times.

In at least some example embodiments, the resident terminal 12 can be configured to present user input interfaces such as shown in FIGS. 3E and 3F for facilitating resident input about food menu items. By way of example, a user selectable touch screen button labeled "Menu Choice" could be shown in place of or in addition to "Symptom Register" Button 702 in the interface 162 (FIG. 3E), and then a series of alternative selectable food options be presented in a interface screen similar to that shown in FIG. 3F. The menu items selected by the resident can then be sent to another terminal 20,21 either within the facility 14 and/or to a terminal 28 outside the facility, such that the desired food items can then be provided to the resident at the appropriate times.

Turning again to FIG. 8, in at least some example embodiments, selection of a "TV" button 180 on remote control 116 allows a user to access television module 134 which allows a patient 18 to switch the display screen 120 from the existing screen to display television programming broadcast using network 16 (or over an alternative network). The patient 18 may then control the television using the remote control 116 (which may for example include channel and volume buttons 182, 184).

In at least some example embodiments, selection of an "Information" button 198 on remote control 116 allows access to the information display module 136, permitting the resident video conference terminal 12 to display information to the patient 18 on the display screen 120. The types of information to be displayed may include: a screen-saver, educational programming, information about the institution, its services and caregiver staff, reminders and information about medication, disease, management and nutrition, reminders about upcoming events, and menu choices for meals (and respective selectable icons for the menu choices). As suggested above, in some example embodiments, such information may be displayed on the default or idle mode screen interface 162 (see FIG. 3A), such that pressing an "Information" button on the remote control 116 is not required to view the information.

In at least some example embodiments, the information display module can also include a patient monitoring station equipment module 138. Patient vital signs information from patient monitoring station equipment (not shown) may be provided to the controller 100, through a short range communications interface 108A between the monitoring equipment and the resident terminal 12 such as a USB cable, or through a short range wireless link, for example a Bluetooth™ connection or an Infrared link. As a result, the patient monitoring station information from the patient monitoring equipment (not shown) may be collected by the resident terminal 12. In some embodiments, collected monitoring information can be displayed on the display screen 120. Typical patient vital signs monitoring equipment can include, among other things, equipment for performing electrocardiograms (EKG), electromyograms (EMG), electroencephalograms (EEG), as well as heart rate/pulse monitoring equipment, breathing monitoring equipment, and blood pressure monitoring equipment. The patient monitoring information may also be sent by resident terminal 12 over network 16 to care provider/monitoring station video conference terminal 20, for viewing by a health care user 22 and/or automated monitoring, and/or to a central server 21 for the facility 14, and/or to an off-site web-based server such as conference server 28. Such a configuration allows the hardware and networks used for video conferencing to also be employed in transmitting patient vital signs information.

In at least some example embodiments, the remote control includes a button 187 to activate and deactivate a speech stretcher module 140 that slows or delays the speech being received by the resident video conference terminal 12. The speech stretcher module 140 thus slows the audio outputted from the speaker 122. This may aid with any diminished hearing capacity of the patient 18. In some example embodiments, the speech stretching function could alternatively be activated and de-activated through a selectable button on the touch screen display 120, including for example a selectable "speech stretcher" button 161 that could be displayed on the screen 120 during a video conference session (see FIG. 5). In at least some example embodiments, the resident user can be provided with an interface for adjusting the amount or degree of speech speed adjustment that occurs during a video conference session when the speech stretching module is activated, and in this regard FIG. 5A illustrates a Speech speed adjustment bar 708 displayed on touch screen display 120 during a video conference session. The resident user can adjust the degree of speech speed adjustment that is applied to incoming audio by touching the adjustment bar at or between the "Slow" and "Normal" locations, and is provided with visual feedback of the current setting. In an example embodiment, the speech stretcher module 140 is configured to track the speech adjustment level that was used in the most recent video conference session used by the terminal and apply that adjustment as the starting default in the next video conference session. In some example embodiments, the default speech adjustment level that is applied is tracked for each specific monitoring or remote terminal that the resident terminal 12 has had past video conference sessions with, allowing the resident terminal 12 to "automatically" apply a default speech speed adjustment that is appropriate for the specific party that the resident is communicating with. Known speech speed adjustment algorithms can be applied by the speech stretching module 140.

In at least some example embodiments, the remote control 116 includes a "stand-by" button 186 which returns the resident terminal 12 to the default interface screen 162 of FIG. 3. Additionally, in an example embodiment, the remote control includes a call nurse button 196a, a call family button 196b and an end call button 196c, each of which performs a similar function as the on-screen call nurse button 150, call family button 152 and end call button 154, respectively.

As indicated above, in at least some example embodiments, the controller 100 implements a setup module 142. The setup module 142 allows a user (typically someone other than a patient 18) to run a setup application to perform various administrative functions to the resident video conference terminal 12. In one embodiment, the setup application is accessed by using a touch screen 114 and simultaneously selecting the end call icon 154 and an unmarked icon in the upper left of the display screen 120. In another embodiment, a temporary keyboard (not shown) may be connected to the resident video conference terminal 12 to interface with the setup module. In another example embodiment, pressing one or more keys 194 on remote 116 may access the setup application. In another example embodiment, the setup application is accessed remotely by an administrator (acting through conference server 28 or monitoring station terminal 20, for example) through Internet 24 and/or network 16.

The setup module may be used to perform account assignment. The account assignment allows assignment of the video conference module 130 to specific monitoring station video conference terminals 20 and/or remote video conference terminals 26. This allows selection of the call nurse icon 150 or call family icon 152 to initiate a session request with the desired video conference terminal. The account assignment may also be used to enter the name of the patient 18, the room number, and a representative graphic of the patient 18.

The setup application may also display menus on the display screen 120 for network setup and hardware setup. The setup application may also allow a selection of languages for display on the display screen 120, for example English, French, and Spanish.

Figure 9:
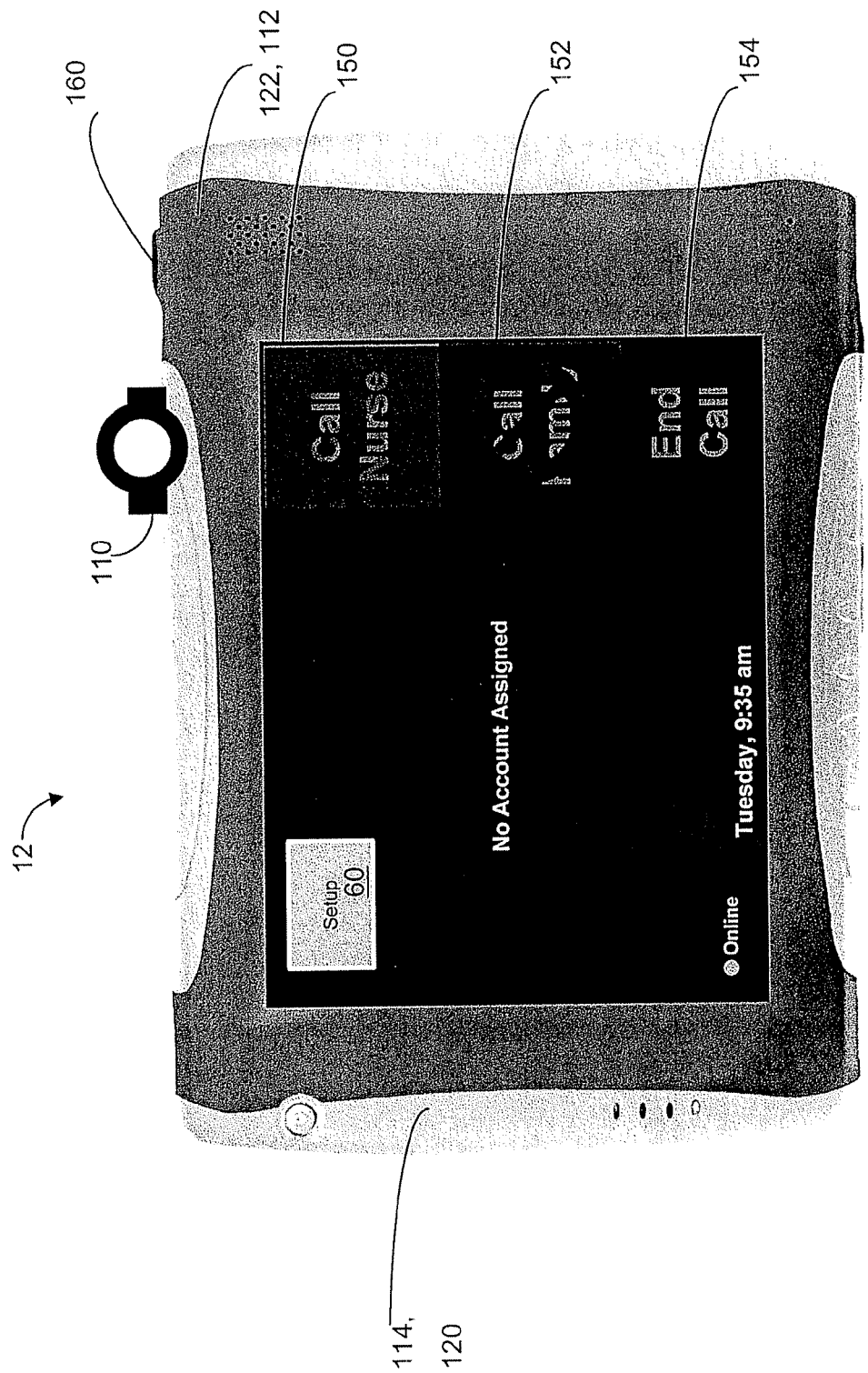
FIGS. 9 to 11 show examples of administrative user interface screens displayed on the resident terminal of FIG. 2 in example embodiments
Figure 10:
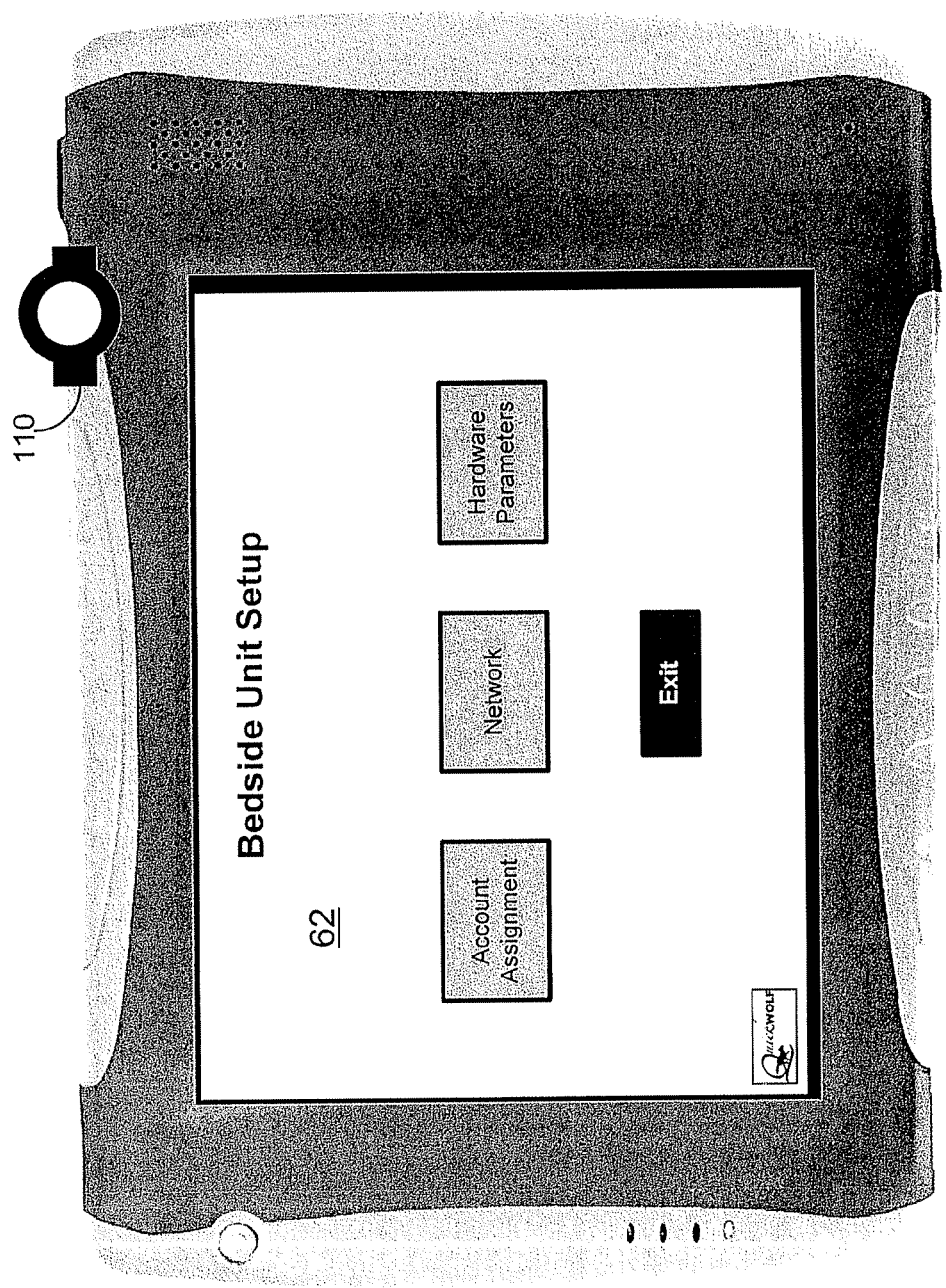
Figure 11:
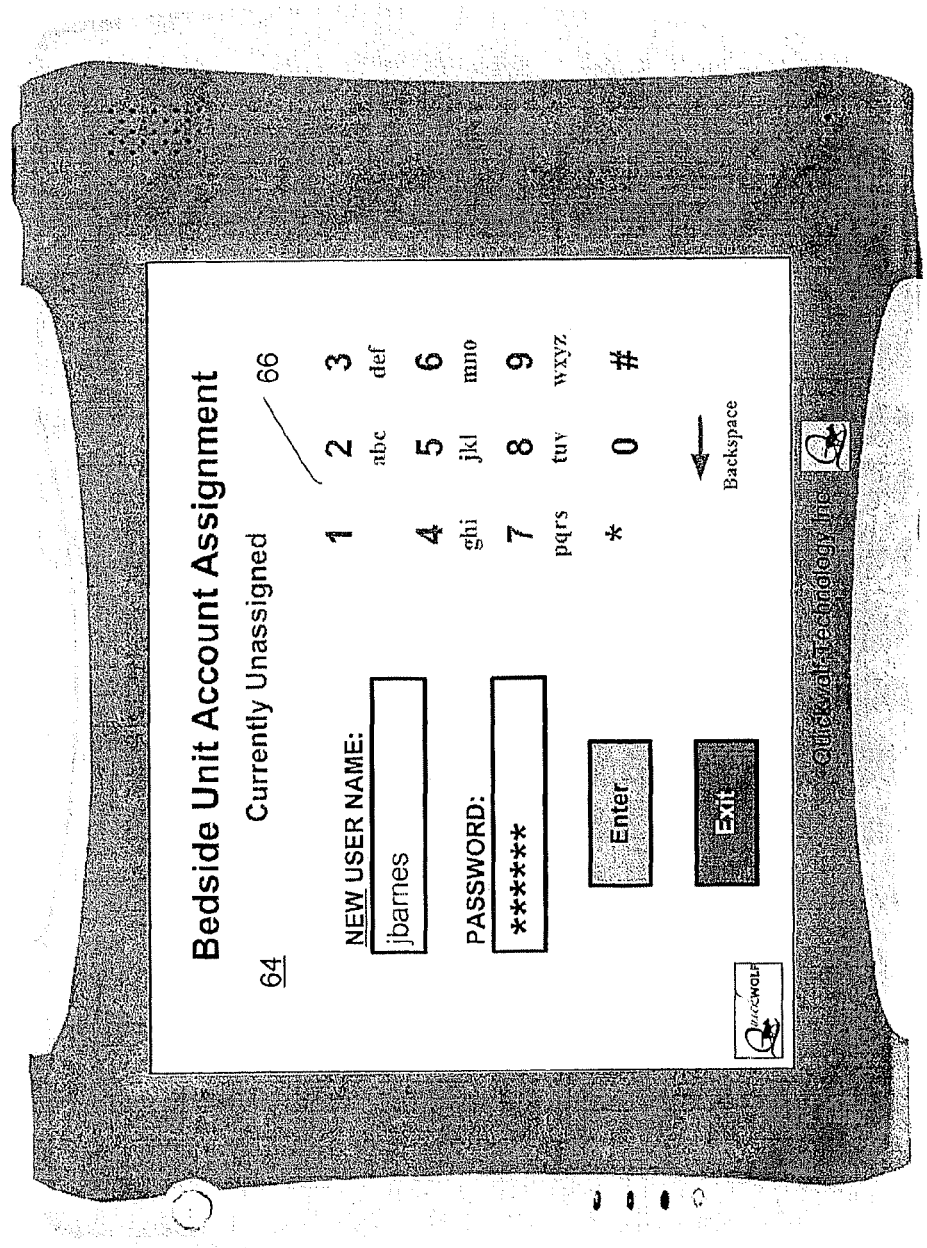

By way of example, FIG. 9 to 11 show examples of some interface screens that can be generated on resident terminal 12 by the setup module 142. FIG. 9 shows a default user interface screen when no resident user is currently assigned to or registered in association with the resident terminal 12. An administrator can press touch screen button 60 to reach a basic setup interface screen 62 shown in FIG. 10, which in the illustrated embodiment offers selectable options of "Account Assignment"; "Network"; "Hardware Parameters"; and "Exit". Selecting the "Account Assignment" button on the touch screen results in the user interface screen 64 of FIG. 11 appearing. Screen 64 includes a touch screen alphanumeric key pad 66 that can be used by an administrator to enter assignment information to assign the resident terminal 12 to a particular resident of the care facility.

Examples of information that can be input during set up of a resident terminal 12 include for example: (1) Room number in institution and/or numeric identifier of patient/resident (in some embodiments, in the absence of a name programmed in the system, the room number will appear as the identifier at the monitoring station terminal 20); (2) Account Number for Video Conference Service (this predetermined account number that is issued by the conference server 28 enables 2-way video chat to be initiated to selected remote terminals 26; the account number is required for the resident terminal 24 to communicate via the Internet 24 with the conference server 28, allowing various data stored at the conference server 28 (identified below) to be transferred to the resident terminal 24 and the monitoring station terminal 20; (3) Monitoring Station Terminal ID—assigns the resident terminal 24 to the specified monitoring station terminal 20 (there can be more than one monitoring station at facility 14); (4) Resident's name (if not already automatically downloaded from conference server 28); (5) Resident's photo (if not already automatically downloaded from conference server 28).

In some embodiments, resident terminal 12 can be configured such that a camera or audio pickup of the terminal 12 or associated with the terminal 12 can, in a one-way monitoring mode of terminal 12, stream near real time video and/or audio from the resident's room to a remote terminal 26 to allow remote parties to monitor in substantially real time the condition of or treatment of the resident. Such remote monitoring feature can, in example embodiments, be activated through setup module 142. In at least some example embodiments, in order to facilitate remote monitoring of the treatment of the resident, the resident terminal 12 includes or is coupled to an auxiliary "monitoring" video camera 712 (see FIG. 2) that is located in the room of the resident 18 that the resident terminal 12 has been assigned to. The auxiliary video camera 712 can be physically separated from the terminal console 160 and coupled to the resident terminal controller 100 through short range communications link 108A (which may be a direct physical link such as a USB cable for example, or a wireless link). The camera 712 can be positioned to offer a wide area view of the resident's room or surrounding environment in order to enable the resident and the treatment of the resident by staff to be remotely monitored. Video camera 712 can also include an audio microphone so that noises in the resident's room can be monitored as well, although such noises could alternatively be monitored through the console microphone 112. In an example embodiment the controller 100 is configured to operate in a one-way monitoring mode in which video signals from the video camera 712 (and possibly audio signals) can be streamed during a monitoring session from the resident terminal 12 to either the central monitoring station 20 and/or an authorized remote terminal 26 through networks 16, 24. In some example embodiments, the on-board camera 110 of the terminal 12 could also be used for one-way monitoring purposes instead of or in addition to the auxiliary camera 712, although the on-board camera 110 may not always be appropriately positioned for optimized viewing of the resident.

In some example embodiments, for privacy reasons, the system 10 is configured so that remote monitoring of the resident is permitted at authorized remote terminals 26 (typically belonging to family members of the resident), but not at the monitoring station terminal 20. In some example embodiments, the resident terminal 12 and/or auxiliary camera 712 are configured to provide a visual or audible indication to the resident when they are being used in a monitoring mode, so that the resident is aware when such monitoring is occurring. In some example embodiments, the resident terminal 12 could be configured or caused to perform the video monitoring periodically at set times throughout the day, with captured video images stored locally at the terminal 12 or off-site at a web-based server such as server 28, for subsequent review at an authorized remote terminal 26.

Figure 27A:
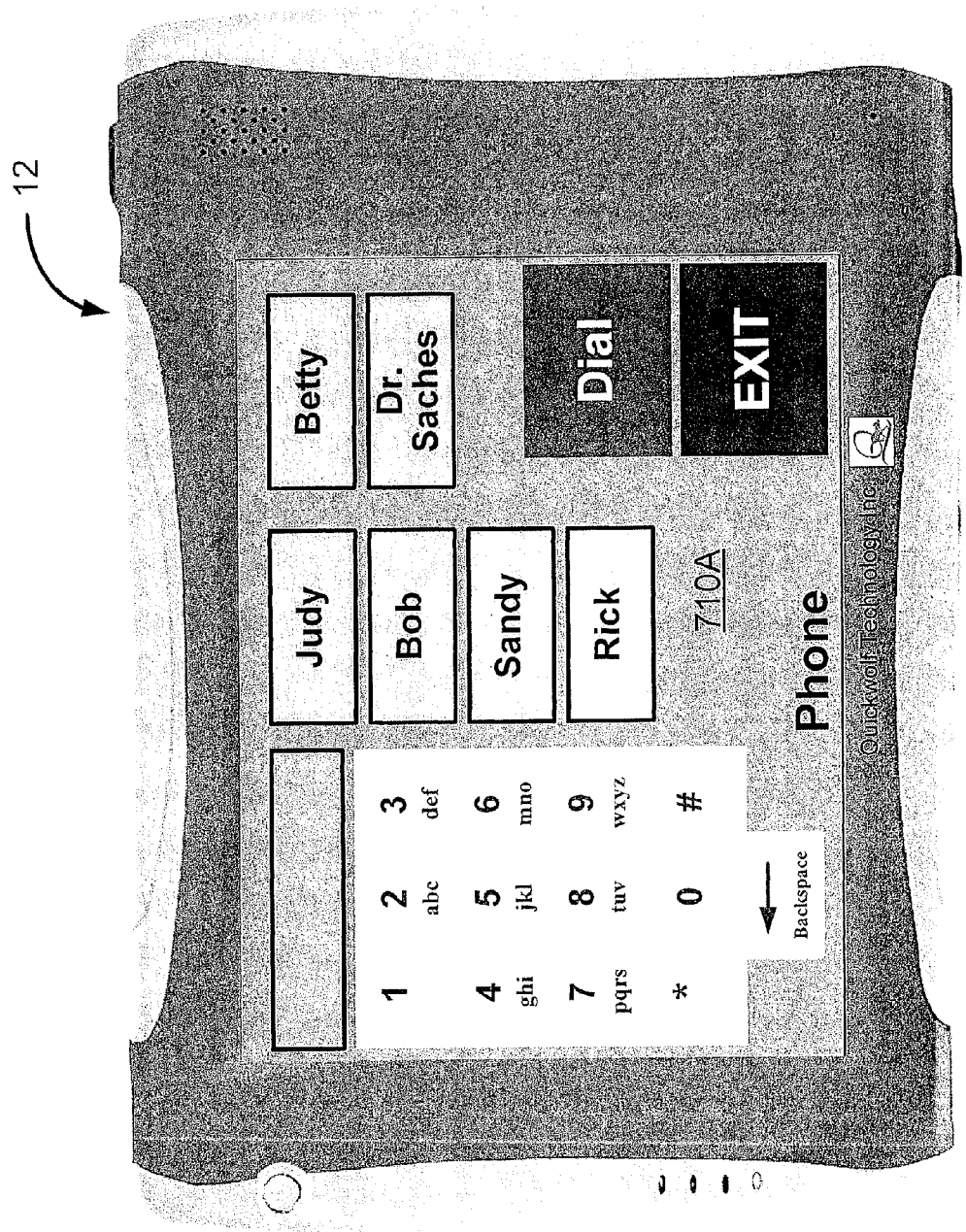
FIGS. 27A-27D illustrate an example of a possible user interface screens for a VOIP function on the resident terminal of FIG. 2.
Figure 27B:
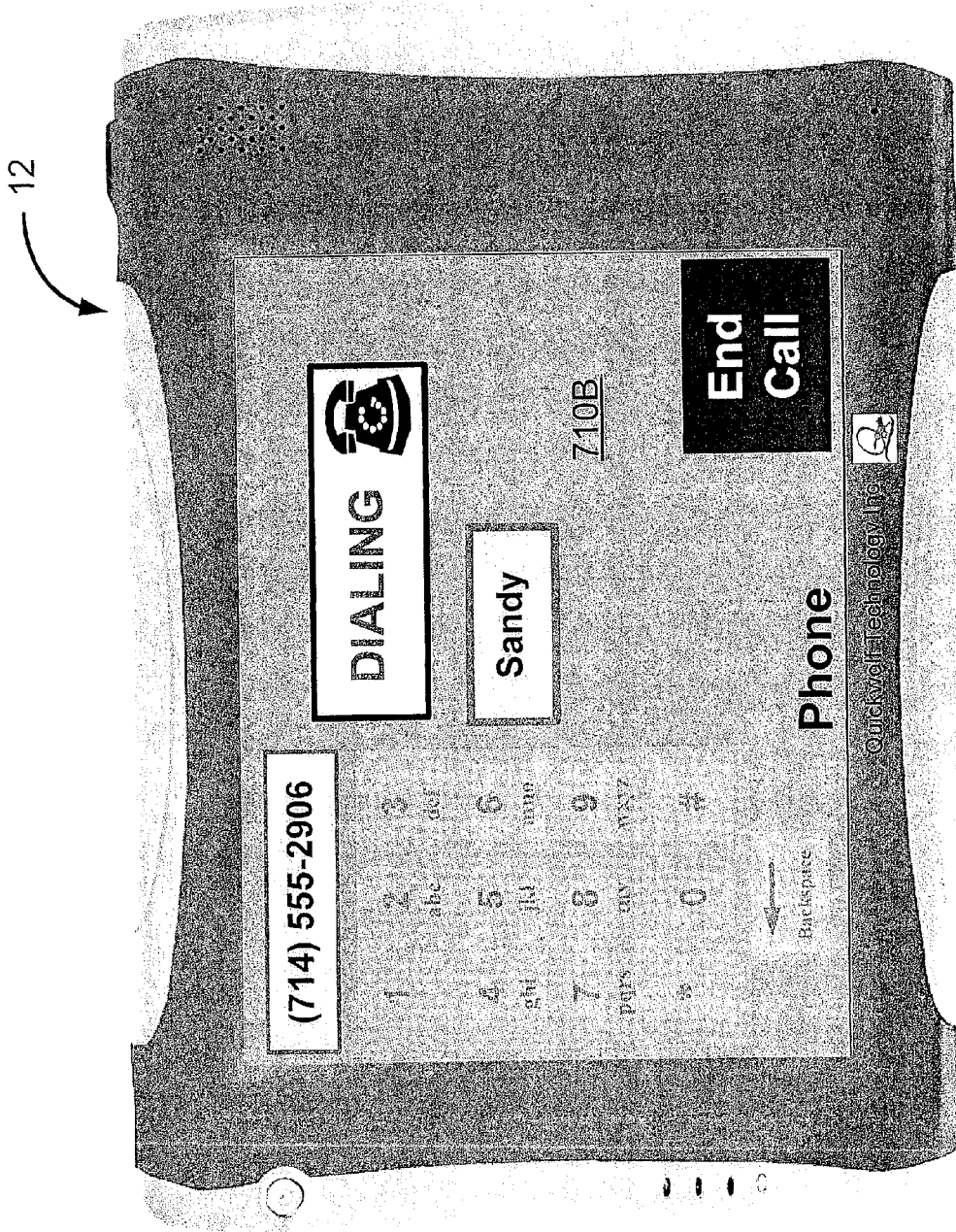
Figure 27C:
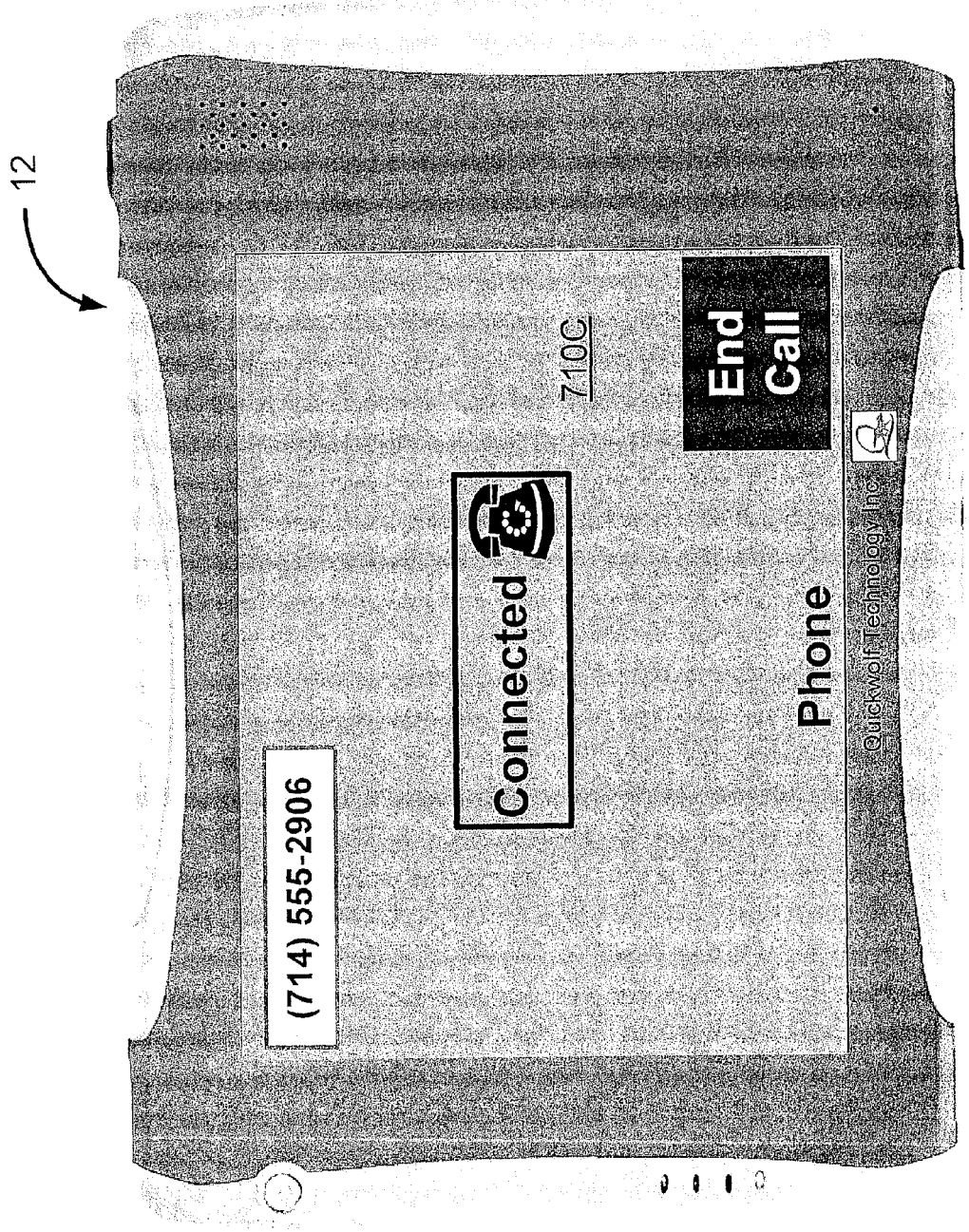
Figure 27D:
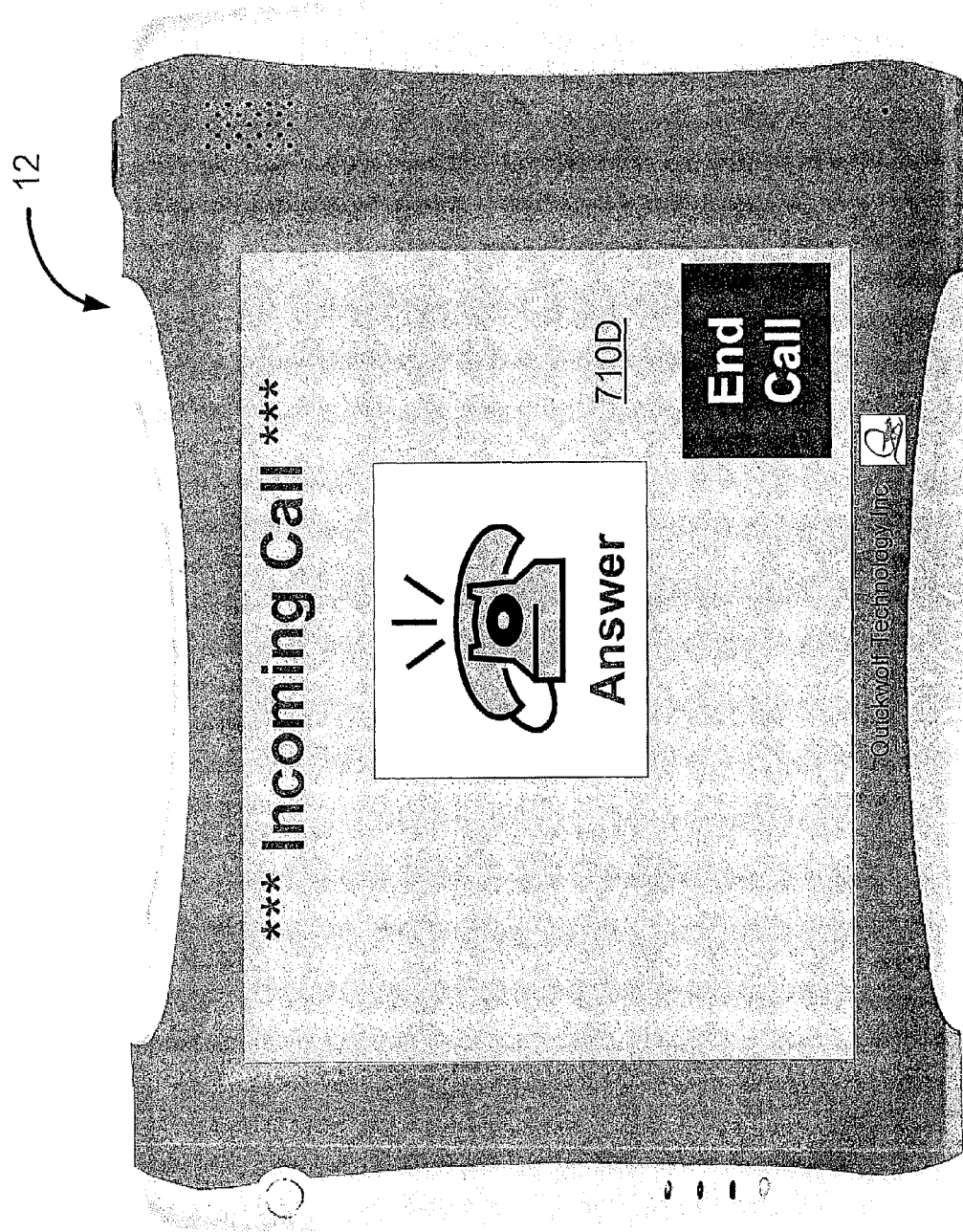

In at least some example embodiments, the resident terminal can include a Voice Over IP (VOIP) module 143 and be configured as a Voice-over-IP telephone terminal to establish and receive calls via the Internet 24, with a suitable interface being provided through the display screen working on its own or in conjunction with the remote control or other input device. By way of example, FIGS. 27A-27D illustrate an example of a possible user interface screens 710A-710D that can be generated on the touch screen display 114/120 of resident terminal 12 by controller 100. The first interface screen 710A allows a user to initiate a VOIP call, and may, for example, be displayed after a user selects a predetermined key on remote control 116, or a user selects a "VOIP" selection touch screen button 714 which could for example be displayed in the idle screen interface 162 (see FIG. 3E). Interface screen 710A allow a user to enter a phone number to call, or to select names of parties for which numbers have been pre-programmed. After entering a number and pressing a "Start Call" button, or after selecting the name associated with a preprogrammed number, the VOIP module 143 causes the terminal 12 to initiate a VOIP call to the appropriate remote terminal. Interface screen 710B of FIG. 27B is an example of a screen that is displayed while the call is being placed, and FIG. 27C is an example of a user interface screen that can be displayed when a VOIP call has been connected. FIG. 27D illustrates a possible user interface 71D that includes user selectable "Answer" button for receiving an incoming VOIP call. As illustrated in each of FIGS. 27A-27D, an "End Call" button can be pressed at any time to terminate the VOIP call process and return to either a prior user interface screen or the idle user interface screen.

As described above, the resident terminal 12 is a portable wireless enabled tablet-style device with a touch screen user interface. In some embodiments, the resident terminal 12 could be implemented in other ways, for example by a suitably configured personal computer that is hard-wired to the local area network 16 and which has an AC power connection.

Care Provider/Monitoring Station Terminal

Reference is now made to FIGS. 12 to 19, which show illustrative embodiments of the care provider/monitoring station video conference terminal 20. In example embodiments, the health care user 22 may use monitoring station terminal 20 to participate in video conference sessions with resident and remote video conference terminals 12, 26.

Figure 12:
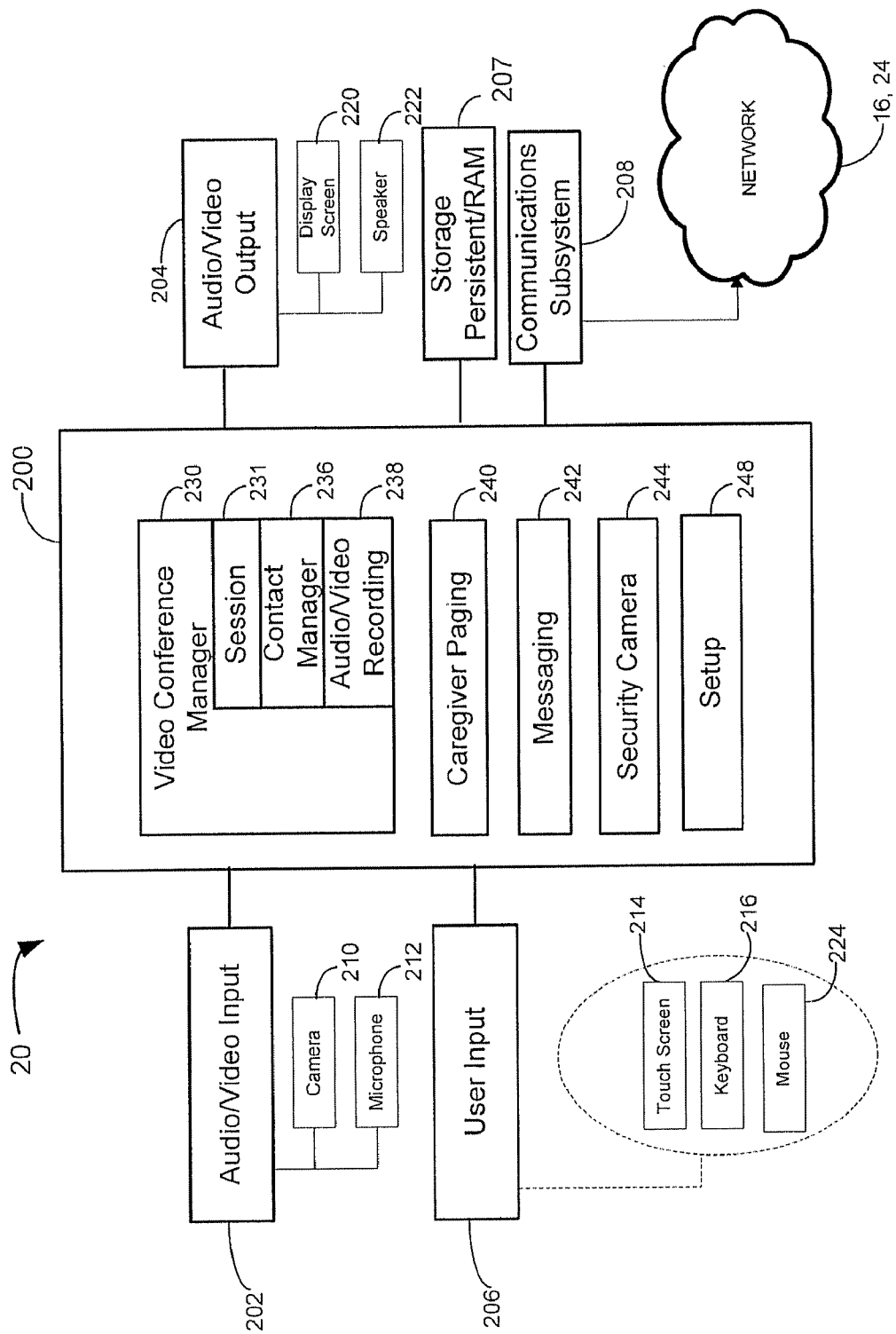
FIG. 12 shows a block diagram of a monitoring station video conference terminal to be used on the communications system shown in FIG. 1.

FIG. 12 shows a block diagram of the monitoring station video conference terminal 20 to be used on the communications system 10. As shown in FIG. 12, the terminal 20 has a controller 200 for controlling its operation, an audio/video input 202 and an audio/video output 204 coupled to the controller, a user input 206, and a communications subsystem 208 coupled to the controller 200 for sending and receiving communications information over the networks 16 and 24. A health care user 22 may operate the monitoring station video conference terminal 20 by manipulating the user input 206. The controller 100 can include one or more microprocessors that are coupled to a storage 207 that includes persistent and/or transient memory. Storage 107 stores information and software enabling the microprocessor(s) of controller 200 to implement the monitoring station terminal functionality described herein.

The audio/video input 202 may be a microphone 212 and camera 210, respectively. The audio/video output 204 may be a speaker 222 and a display screen 220, respectively. As shown, suitable options for the user input 206 may be a touch screen 214, a keyboard 216, and a mouse 224. The monitoring station video conference terminal 20 may be a conventional personal computer with the appropriate peripheral devices.

In an example embodiment, there are a number of modules implemented through software running on the controller 200 that may perform desired functions on the monitoring station video conference terminal 20. The software instructions used to implement the various modules can be stored on storage 207, for example. As shown, the controller 200 has a video conference manager module 230, a caregiver paging module 240, a messaging module 242, a security camera module 244, and a setup module 248. The video conference manager module 230 includes a session module 131, a contact manager module 236, and an audio/video recording module 238. The contact manager module 236 permits the managing of contact information of both patients 12 and remote users 30.

Figure 13:
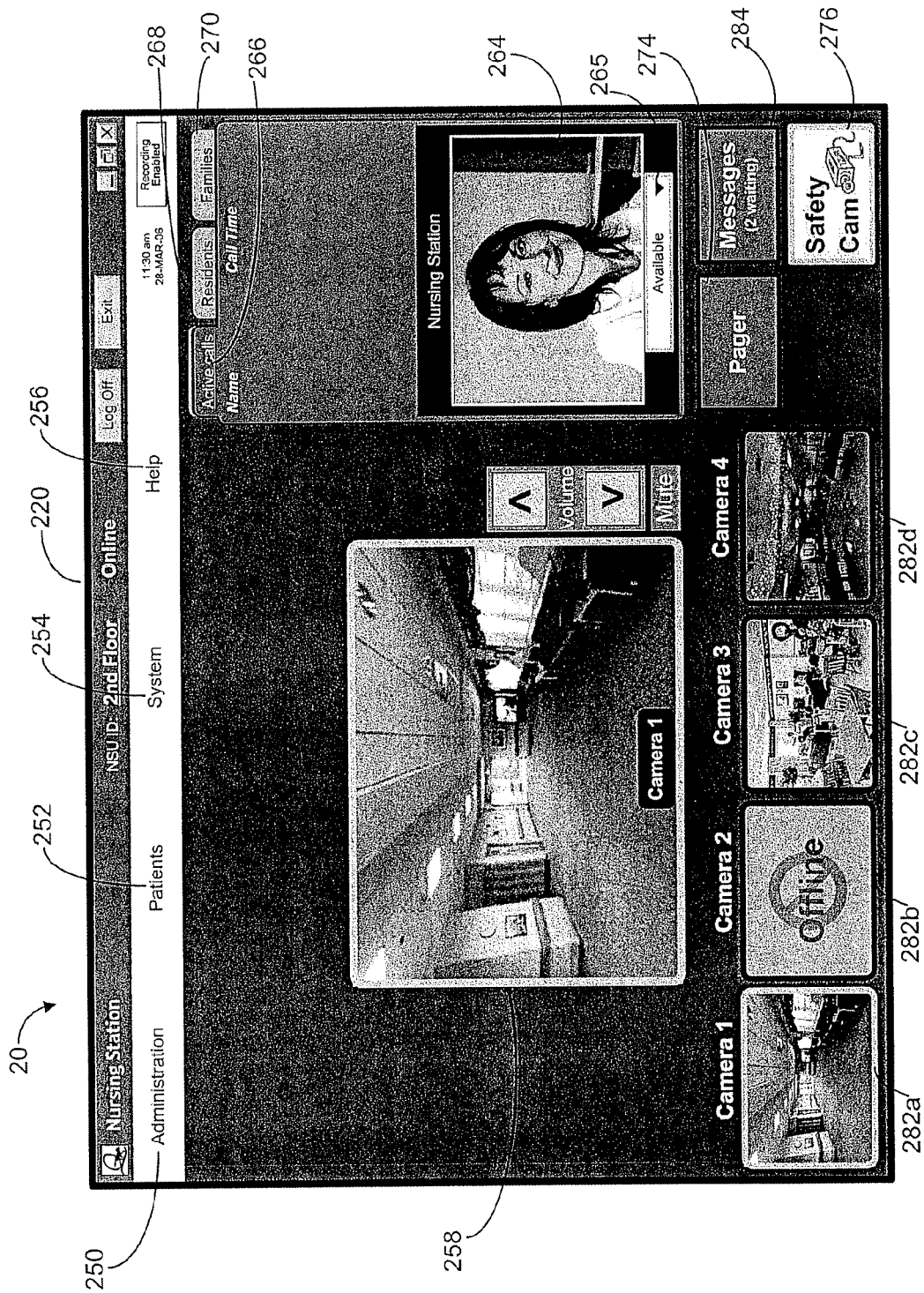
FIG. 13 shows a diagrammatic view of an example graphical user interface of an idle screen for the monitoring station video conference terminal of FIG. 12.

FIG. 13 is an example of a user interface screen on the display screen 220 of the monitoring station video conference terminal 20 for operation by a health care user 22. The user interface screen of FIG. 13 shows an example idle mode screen when the monitoring station terminal 20 is not involved in any active video conference sessions. As shown, there is an administration button or icon 250, a patients icon 252, a system icon 254, and a help icon 256. There is also a pager icon 274, a safety cam icon 276, and a messages icon 284. There is a main video display 258 which may show video images, for example during a video conference session (a feed from a security camera is shown in the example idle mode screen of FIG. 13). Selection of the administration icon 250 displays on the display screen 220 an administration interface. Selection of the patients icon 252 displays on the display screen 220 a summary page of patient 18 information. Selection of the system icon 254 displays on the display screen 220 a system setup page.

Figure 14:
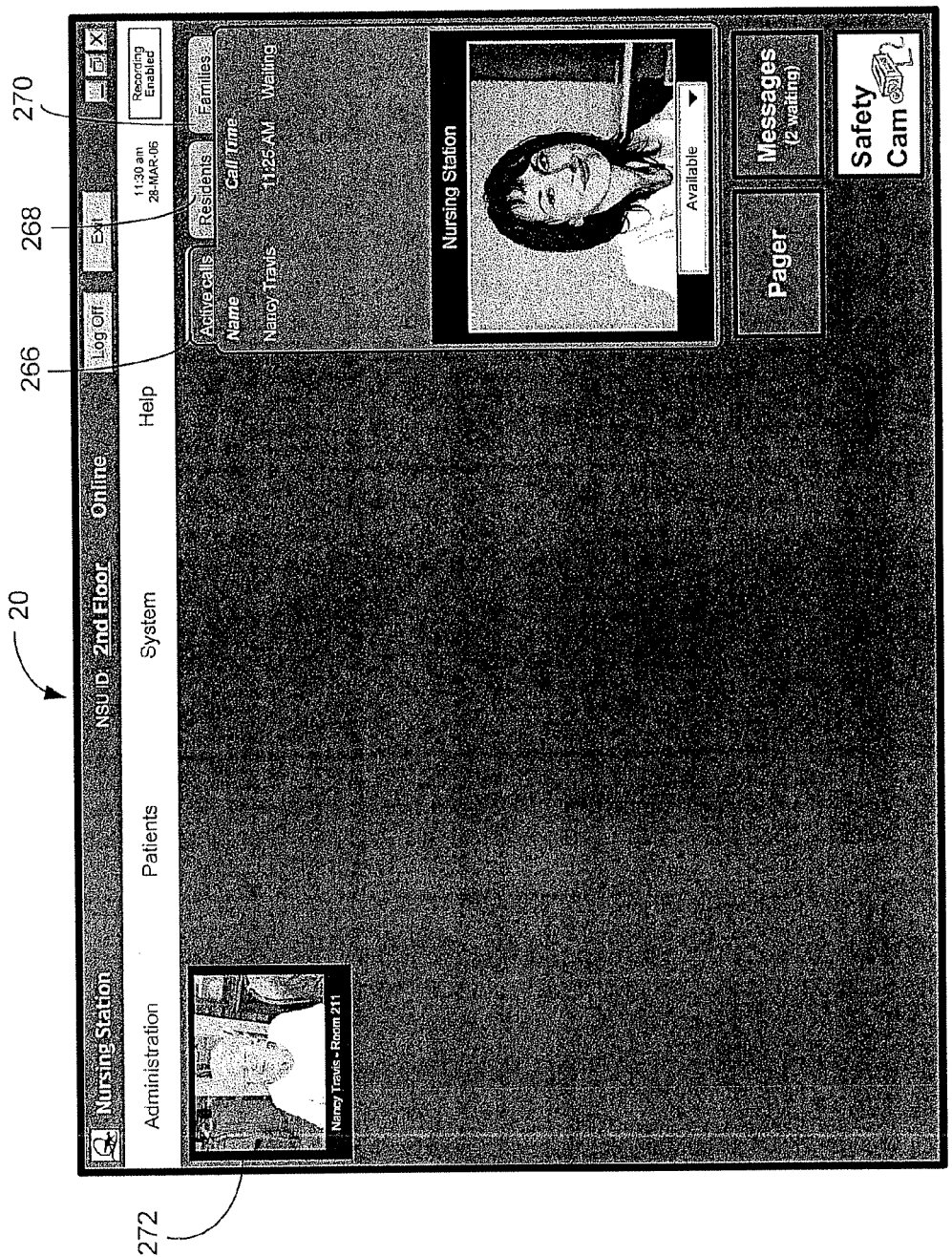
FIG. 14 shows a diagrammatic view of an example graphical user interface of an incoming session request screen for the monitoring station video conference terminal of FIG. 12.
Figure 15:
FIG. 15 shows a diagrammatic view of an example graphical user interface of a multiple incoming session request screen for the monitoring station video conference terminal of FIG. 12.
Figure 16:
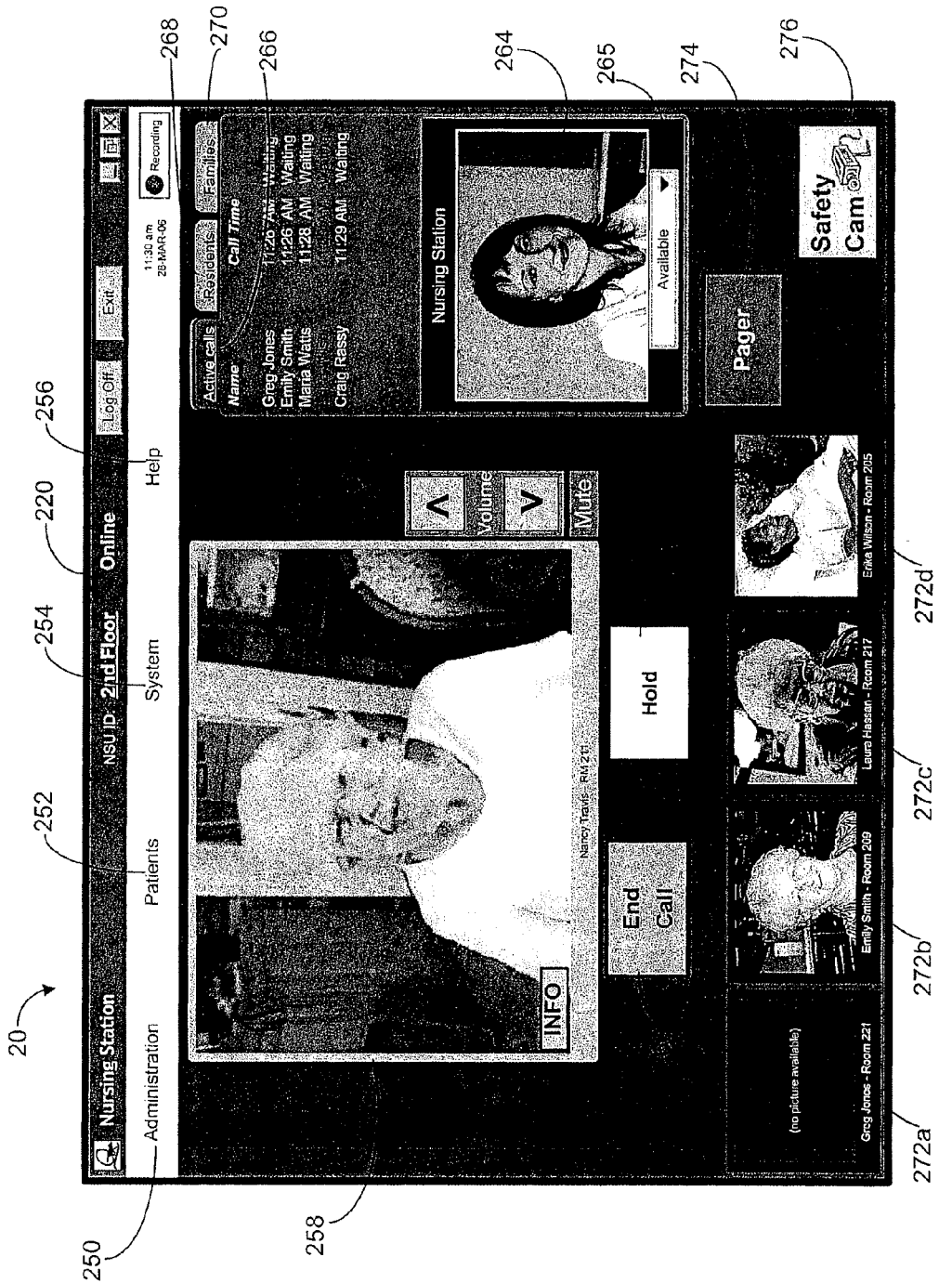
FIG. 16 shows a diagrammatic view of an example graphical user interface of a current video conference session for the monitoring station video conference terminal of FIG. 12.

As shown in FIG. 13 to 19, the interface for the remote monitoring terminal 20 includes a tabbed active calls menu 266, residents menu 268, and families menu 270. The selected active calls menu 266 shows a list of active video conference calls between the monitoring station 20 and resident terminals 12 (see FIGS. 13-16). As shown in FIG. 16, when selected, the active calls menu 266 displays the resident name for the active calls, the call time, and the status (for example, "waiting" or "Hold").

Figure 18:
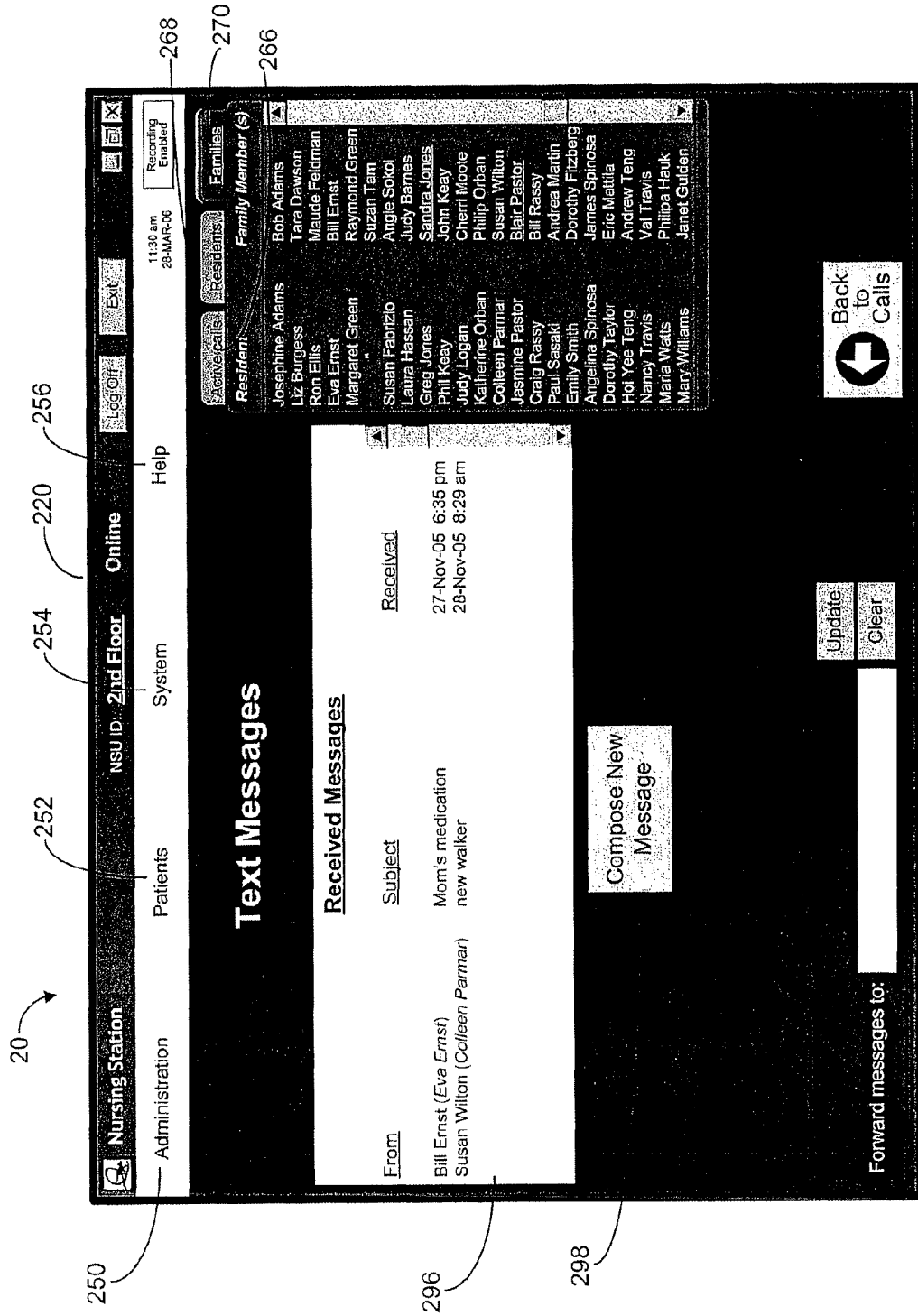
FIG. 18 shows a diagrammatic view of an example graphical user interface of a messaging function for the monitoring station video conference terminal of FIG. 12.
Figure 19:
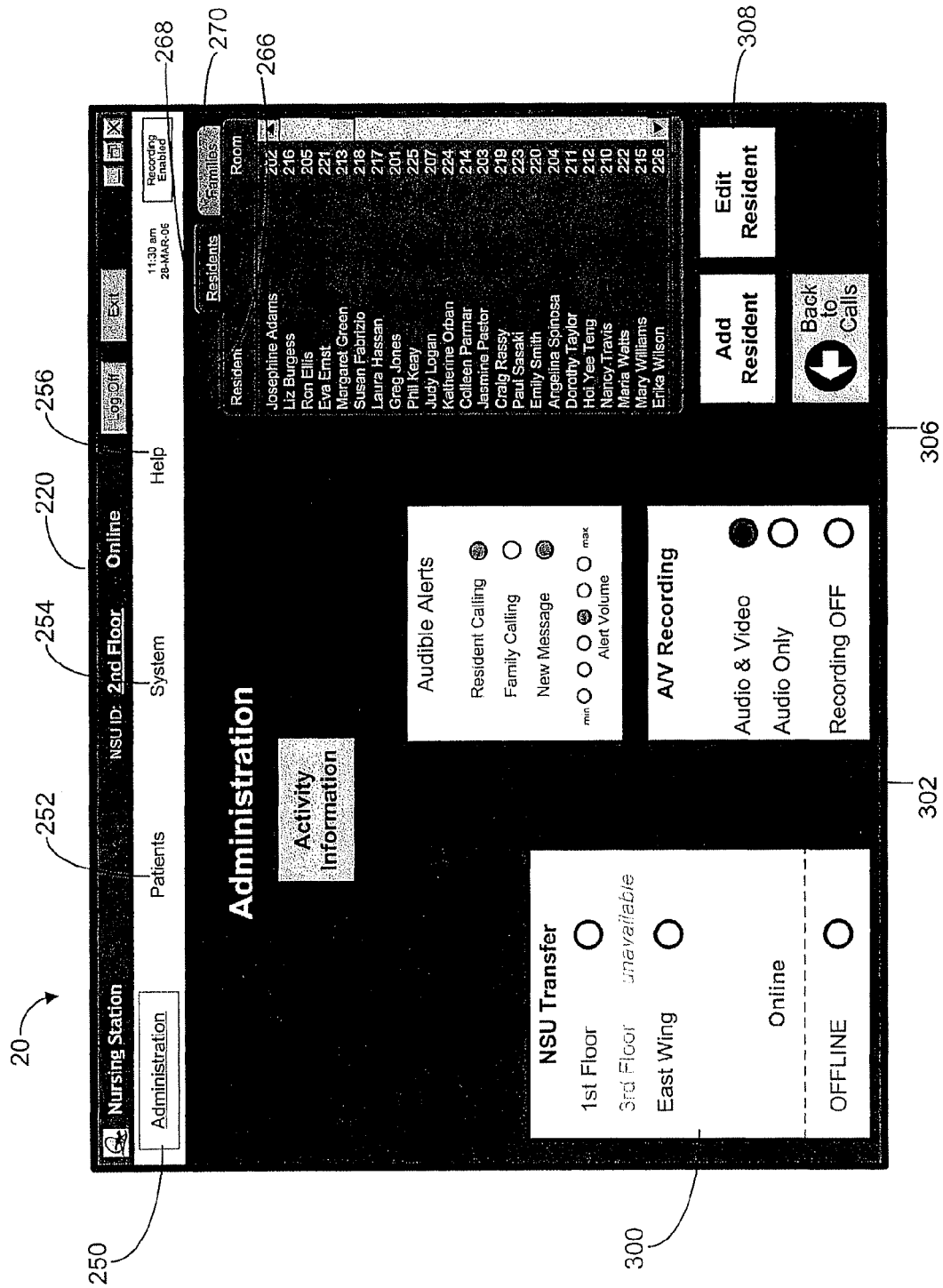
FIG. 19 shows a diagrammatic view of an example graphical user interface of an administration function for the monitoring station video conference terminal of FIG. 12.

The residents menu 268 is best illustrated in FIG. 19, and shows a list of patients 12 and their respective information, such as room number. Another patient 12 may be added to the residents menu 268 by selecting the add-resident icon 306. A patient 12 may be edited by selecting the edit resident icon 308. Similarly, selection of the families menu 270 shows a list of remote users 30 and their respective information (as best illustrated in FIG. 18).

The session module 231 (FIG. 12) manages the establishment and termination of video conference sessions between the monitoring station terminal 20 and other terminals. To initiate a session request with a resident video conference terminal 12 over local network 16, a health care user 22 may use the monitoring station video conference terminal 20 and select the residents menu 268 using the user input 206 (as best illustrated in FIG. 19). The health care user 22 may then select a patient 12 from the list of patients. Upon selection of a patient 12, the session module 231 initiates a session request to the specified resident video conference terminal 12. The resident video conference terminal 12 will display the phrase "Nurse is Calling" on the display screen 120, as shown in FIG. 7. The patient 18 may accept the session request, as explained above, thereby initiating a substantially real-time video conference session.

Reference is now made to FIG. 14. The monitoring station video conference terminal 20 may also receive a session request from a resident video conference terminal 12. When a resident video conference terminal 12 initiates a session request (as explained above), the monitoring station video conference terminal 20 displays the incoming session request on the display screen 220 as follows. The name of the patient 12 is displayed on the active calls menu 266 and additionally, in at least some example embodiments, a patient thumbnail 272 including a still image (pre-stored) along with the name and room number of the calling patient 12 is displayed. An audible sound can also be used in some embodiments to signal the incoming session request. In at least some example embodiments, the patient thumbnail 272 could present active video live from the resident terminal rather than just a pres-store still image. The health care user 22 may accept the session request by selecting the appropriate patient thumbnail 272 or by selecting the name of the patient 12 displayed on the active calls menu 266, thereby initiating the network session. As represented in FIG. 15, in some example embodiments, the monitoring station terminal 20 may receive a number of concurrent incoming video conference session requests for processing in which case names and thumbnail images for each of the incoming requests can be displayed (see thumbnails 272a-272d for example), and the incoming requests can be displayed in the Active Calls list 266. In an example embodiment, the care giver can accept a session by using an on-screen indicator to point at and select an appropriate thumbnail image or name in the calls list 266 to processing with establishing a video conference session. As shown in FIG. 15, a pre-existing video conference session is labeled as "On-Hold" (see thumbnail 272), meaning that a video conference session with that particular resident has been placed on-hold. In some example embodiments, some residents may be identified, through pre-configuration, as residents requiring extra care or attention, such that incoming session requests from such patients can be flagged visually and/or audibly in order to bring them quickly to the attention of the care giver 22. By way of example, in FIG. 15, the resident associated with thumbnail 272d (Erika Wilson) has been pre-identified as a resident requiring special attention, and accordingly when an incoming session request from her resident terminal 12 is received at monitoring station terminal 20, both her still thumbnail image 272d and her name in calls list 266 are presented in a different colour (for example red) than the remaining thumbnail images/names, thereby visually flagging that she is a resident that a quick response is desirable for.

A video conference session user interface screen for an on-going session is best illustrated in FIG. 16 (which illustrates a session with a patient 18). The display screen 220 shows a main video display 258, a healthcare user video display 264, a status menu 265, a volume control 278, an end call icon 260, and a hold icon 260. A substantially real-time video stream of the patient 18 will appear on the main video display 258, and a substantially real-time audio of the patient 18 will be output from the speaker 222 for the health care user 22. A video of the health care user 22 will be captured by the camera 210 and the audio will be captured by the microphone 212, for substantially real-time transmission to the resident video conference terminal 12. A video image 264 of the health care user 22 can also be displayed on the monitoring terminal 20, which mirrors what is shown on the resident video conference terminal 12.

Referring again to FIG. 13, the status menu 265 may be set to "available" or "unavailable". If the status menu 265 is set to "available", the monitoring station video conference terminal 20 is available for network sessions. If the status menu 265 is set to "unavailable", the monitoring station video conference terminal 20 is not available for network sessions and any existing network sessions are ended or terminated. The volume control 278 may be used to increase or decrease the volume from the speaker 222, or to mute the speaker 222. Selection of the end call icon 260 will end or terminate the active session that is currently shown in window 258, and take the terminal 20 to the "Incoming Session Request" interface screen of FIG. 15 if other sessions are active, or to an idle screen (such as shown in FIG. 13) if no other sessions are active. Selection of the hold icon 260 will hold the active network session that is currently shown in window 258, and take the terminal 20 to the "Incoming Call" interface of FIG. 15.

The monitoring station video conference terminal 20 may also initiate a video conference session with a remote video conference terminal 26 over Internet 24. For example, to initiate a session request with a remote user 30, a health care user 22 may use the monitoring station video conference terminal 20 and select the families menu 270 using the user input 206 (see FIG. 18). The health care user 22 may then select a remote user 30 from the list of remote users. Upon selection of a remote user 30, the session module 231 initiates a session request to the specified remote video conference terminal 26. The remote user 30 may accept the session request, thereby initiating the network session. In some example embodiments, a three-way video conference session between a resident terminal 12, a monitoring station terminal 20 and a remote user terminal 26 can be implemented.

Referring now to other modules implemented on controller 200, in at least some example embodiments the audio/video recording module 238 permits the recording of video conference session with the monitoring station video conference terminal 20. As shown in FIG. 19, the audio/video recording menu 302 may be used to configure the audio/video recording module 238. As shown on the audio/video recording menu 302, the monitoring station video conference terminal 20 may record both audio and video, audio only, or recording off.

Figure 17:
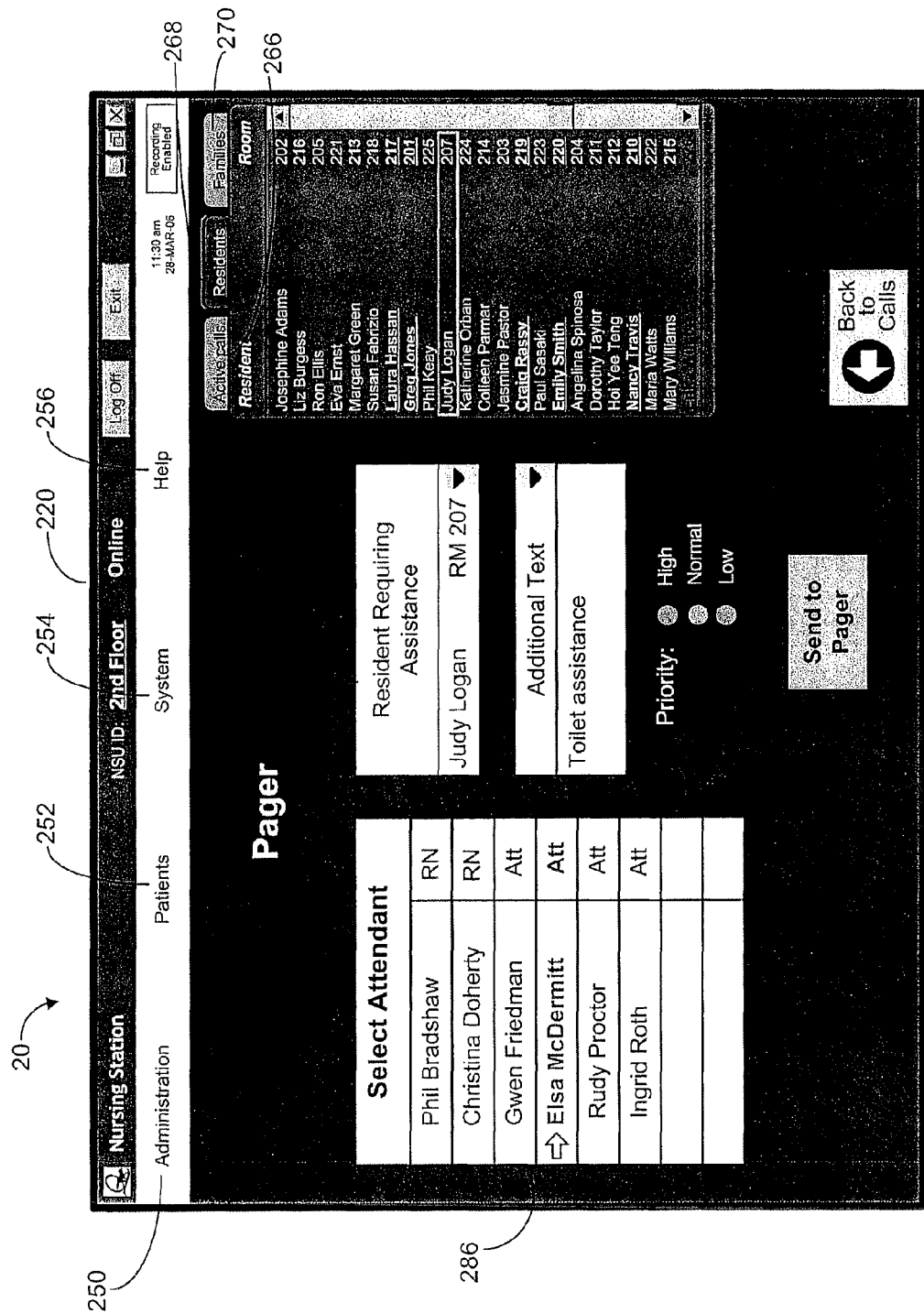
FIG. 17 shows a diagrammatic view of an example graphical user interface of a paging function for the monitoring station video conference terminal of FIG. 12.

In at least some example embodiments, as illustrated in FIG. 17, the caregiver paging module 240 permits the monitoring station video conference terminal 20 to send paging to pagers or other wireless devices carried by caregivers. The caregiver paging module 240 runs a paging application that is accessed from selecting the pager icon (274 in FIG. 16). As shown in FIG. 17, there is an attendant menu 286, a resident requiring assistance menu 288, an additional text menu 290, a priority menu 292, and a send icon 294. The attendant menu 286 has a list of caregivers for selection. The attendant menu 286 shows the name of the caregiver and the position (i.e. registered nurse (RN) or attendant (Att)). The resident requiring assistance menu 288 has a drop-down list of patients 18 and the respective room numbers. The additional text menu has drop-down list of optional text to accompany the page. As shown, toilet assistance is a possible option. Other options (not shown) include bed discomfort, move to/from bed, food, spill clean-up, and drink. In addition to the drop down list of pre-defined common text, a custom message can be typed in at any time. The priority menu 292 has a list of high, normal, and low, to indicate the priority of the page. An appropriate paging message would include the name of the attendant, the name of the patient 18, the room number, the additional text, and the priority. Upon selection of the send icon 294, the caregiver paging module 240 sends the paging message over network 16 to a paging system that packages the paging message and sends it over a wireless network to the appropriate paging device.

In at least some example embodiments, the messaging module 242 runs a messaging application as represented in FIG. 18. The messaging application may be initiated by selecting the families menu 270 or by selecting the messages icon (284 in FIG. 13) when a message is waiting. As shown, there is a received messages menu 296, a compose new message icon 298, and a forward messages field 299. The received messages menu 296 has a listing of messages, and includes the sender name, the subject, and the received date. Upon selection of one of the messages, the message will be displayed on the display screen 220 (not shown). The compose new message icon 298, when selected, displays a composition screen (not shown) for composing a new text or email message. The forward messages field 299 allows a user to forward a message upon receipt to an alternative email address.

In at least some example embodiments, the security camera module 244 implements a security camera function as represented in the idle screen of FIG. 13. The security camera application may be initiated by selecting the safety cam icon 276 (see FIG. 13), which fades when selected. As shown, the main video display 258 shows a security camera video image (shown on the idle screen of the monitoring station terminal 20 in the illustrated example) taken from a security camera that is located in a common area of the facility 14. The speaker (222 in FIG. 6) may also output audio corresponding to the video image. Camera thumbnails (282 a-d) show smaller video images of other selectable security camera video images of other common areas in the facility. Upon selection of one of the camera thumbnails (282 a-d), the corresponding security camera video image will be shown on the main video display 258. In some example embodiments, in addition to or as an alternative to viewing images captured through security cameras located in common areas of the facility, the monitoring station terminal 20 can also be configured to permit monitoring of residents through one-way video streamed from either the main camera 110 or the auxiliary camera 712 of one or more resident terminals 12 can be viewed at the monitoring station terminal 20.

In at least some example embodiments, the setup module 248 allows a health care user 22 or other person to perform various administrative functions to the monitoring station video conference terminal 20. As shown in FIG. 19, the setup application may be initiated by selecting the administration icon 250. As shown, there is an activity information icon 310, an NSU transfer menu 300, an audible alerts menu 304, and the audio/video recording menu 302. Selection of the activity information icon 310 displays on the display screen 220 an information page (not shown) for composing and enabling of information pages to be shown by the information display module 136 on the resident video conference terminal 12. The NSU transfer menu 300 permits the monitoring station video conference terminal 20 to transfer responsibility for a group that includes a plurality of resident terminals 12 from the terminal 20 to another video conference terminal 20, after which incoming video conference requests from resident terminals 12 and remote terminals 26 previously associated with the remote monitoring terminal 20 will be routed to another remote monitoring terminal 20. Thus, all of the features and services that a monitoring station 20 is providing or performing for a group of resident terminals 12 that are assigned to it could be transferred for the entire group to another monitoring station terminal by selecting the desired transferee terminal option from menu 300. For example, a facility 14 may have a plurality of remote monitoring terminals 20 that each have a respective coverage area or resident responsibility during peak times, with the coverage areas/responsibility being consolidated to fewer terminals during non-peak times.

In at least some example embodiments, as indicated in FIG. 19, an audible alerts menu 304 may be used to configure the alert volume for specified events, such as resident calling, family calling, and new message. A system icon 254 may also be selected to configure the monitoring station video conference terminal 20 for applications such as network parameters (such as Internet Protocol address), timeouts, passwords, and unit identification.

Setup of the monitoring station terminal 20 can include providing information to the terminal such as: (a) input of an identifier for the monitoring station terminal 20—associated with an IP address, this identifier allows the resident terminals 12 to make themselves available to a particular monitoring station terminal 20; (b) User names and passwords for caregivers using this monitoring station terminal 20; (c) identification of resident terminals 12 visible on network that will be associated with and hence share 2-way video chat with the monitoring station terminal 20; (d) Photos and names of residents if not available from the resident terminal or other sources automatically—these photos become the thumbnails presented at the monitoring station terminal 20 when a session request is initiated; (e) Information (names, email addresses) for family members subscribing to the service will in at least some example embodiments be automatically uploaded to the monitoring station terminal 20 from the resident terminal 12 and/or conference server 28 if the information is available and (f) Safety Camera are chosen and enabled from a list of available cameras presented after an automatic discovery of which cameras are on the network with the monitoring station terminal 20. Safety Cams may have default names (Camera 1, Camera 2 . . . ) on the network, but can be renamed monitoring station terminal 20.

In at least some example embodiments, some of the information used by a care giver monitoring terminal 20 can be stored on central server 21 within the care facility network 16, such that such information can be accessed by a plurality of monitoring terminals 20. For example, patient information including a patient photograph, room number, etc. could be stored in a central server 21 and drawn on by various monitoring terminals 20. Account information identifying the monitoring terminals 20 of the care facility 14 to the conference server 28 and/or remote terminals 26 can be stored on the central server 21.

Remote Terminals

Figure 20:
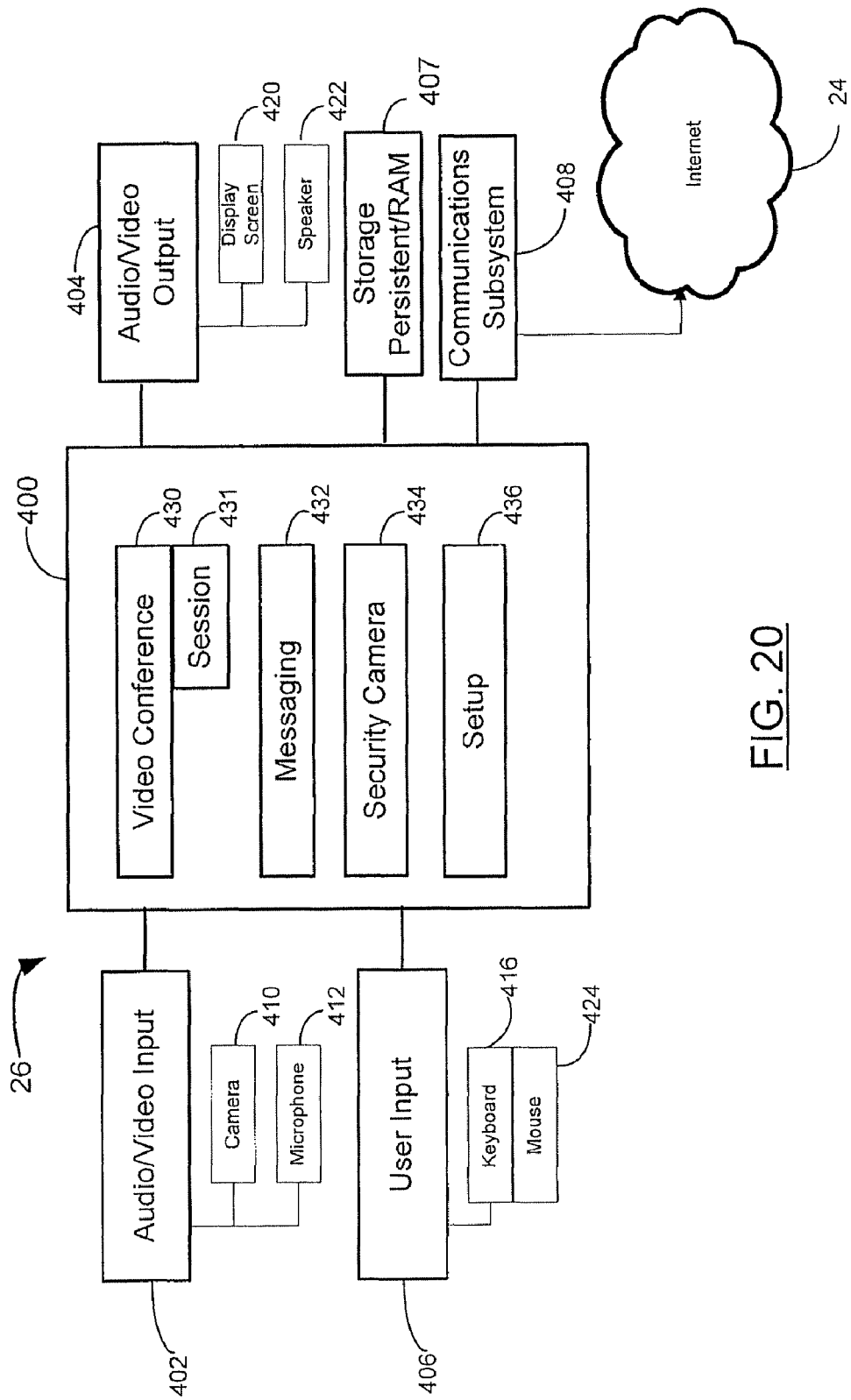
FIG. 20 shows a block diagram of a remote video conference terminal to be used on the communications system shown in FIG. 1.

Reference is now made to FIGS. 20 to 24, which show illustrative embodiments of the remote video conference terminal 26 for use by a remote user 30. FIG. 20 shows a block diagram of the remote video conference terminal 26 to be used on the communications system 10. As shown in FIG. 20, the remote video conference terminal 26 has a controller 400 that includes one or more processors for operation of the remote video conference terminal 26, an audio/video input 402 and an audio/video output 404 coupled to the controller, a user input 406, a electronic storage 407 including persistent and RAM storage elements, and a communications subsystem 408 coupled to the controller 400 for sending and receiving communications information over the network (Internet) 24. The audio/video input 402 may be a microphone 412 and camera 410, respectively. The audio/video output 404 may be a speaker 422 and a display screen 420, respectively. As shown, suitable options for the user input 406 may be (but are not limited to) a keyboard 416 and a mouse 424. The example embodiments, the remote terminal 26 can be implemented through a wide variety of electronic devices that are enabled to exchange video and audio data through a wide area network such the Internet, including for example a suitably configured stationary personal computer, a mobile lap top or other mobile computing device such as a handheld personal digital assistant or cell phone.

Software instructions stored on storage 407 configure the controller to implement modules on the controller 400 to perform desired functions. As shown, the controller 400 has a video conference manager module 430, a messaging module 432, a security camera module 434, and a setup module 436. The video conference module 430 includes a session module 431.

Figure 21:
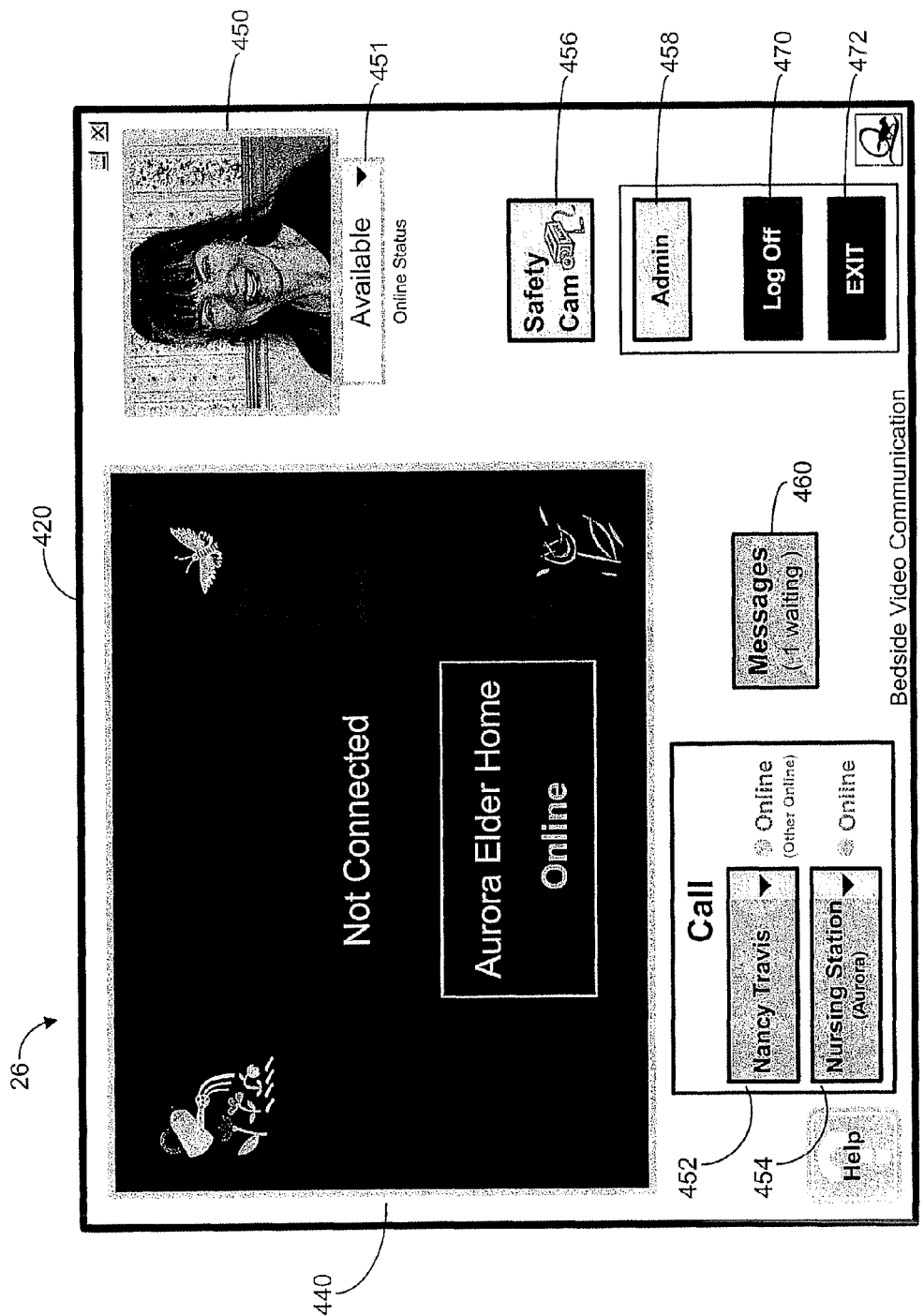
FIG. 21 shows a diagrammatic view of an example graphical user interface for the remote video conference terminal of FIG. 12.

FIG. 21 is an exemplary video conference user interface screen 420 of the remote video conference terminal 26. As shown, there is a main video display area 440, a remote user video display area 450, a status menu 451, a safety cam icon 456, an administration icon 458, a log off icon 470, and an exit icon 472. The main video display 440 may show video images, for example of another party in a video conference session. A video image of the user 30 of the remote terminal 26 is displayed on the remote user video display 450, which mirrors what is displayed on the other video conference terminal. The status menu 451 may be set to "available" or "unavailable". If the status menu 451 is set to "available", the remote video conference terminal 26 is available for network sessions. If the status menu 451 is set to "unavailable", the remote video conference terminal 26 is not available for network sessions and any existing network, sessions are ended or terminated.

Figure 23:
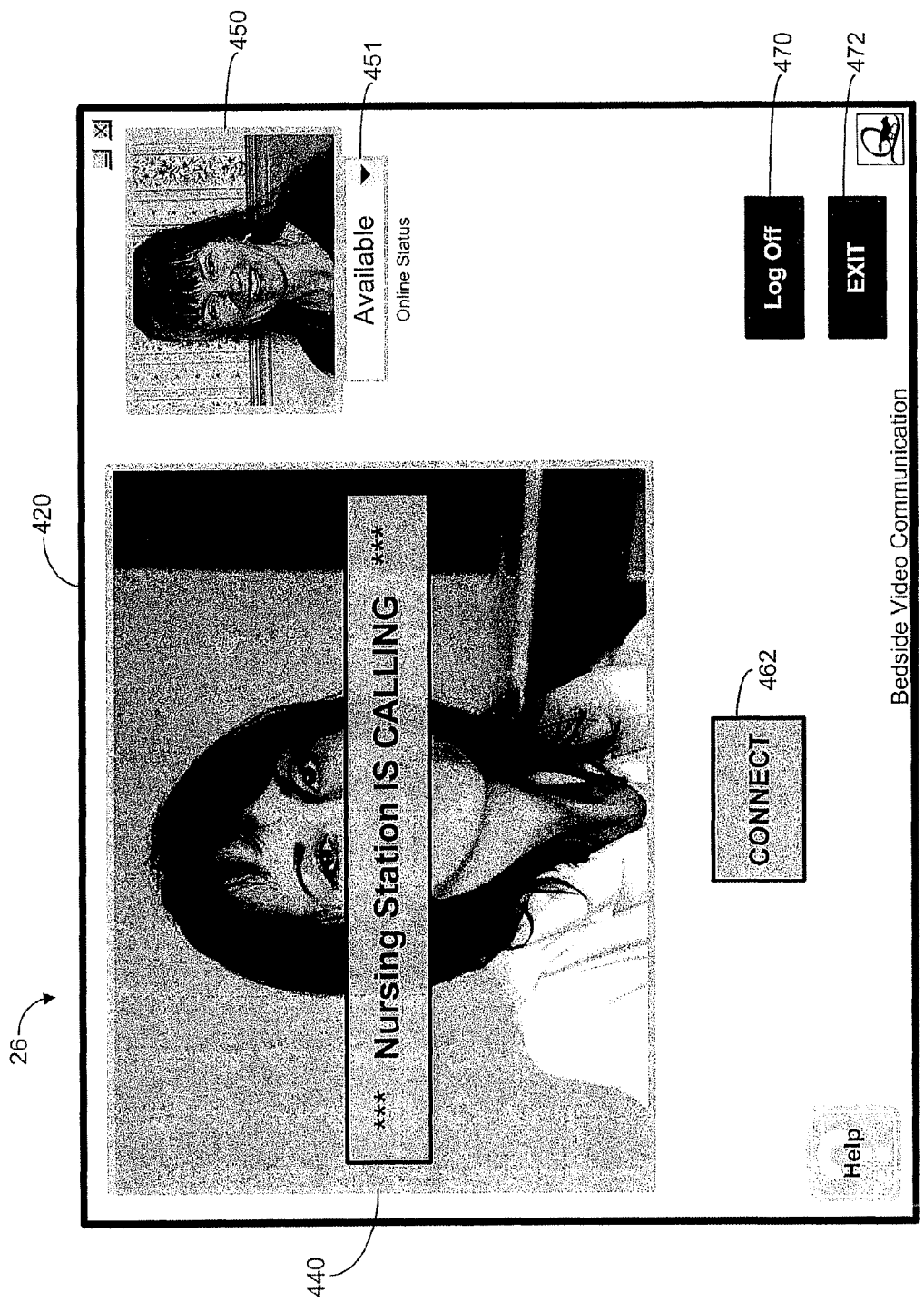
FIG. 23 shows a diagrammatic view of another example graphical user interface for an incoming session request from a monitoring station terminal for the remote video conference terminal of FIG. 12.

Operation of the video conference module 430 is illustrated in FIGS. 21 to 23. FIG. 21 shows a call patient or resident menu 452 and a call health care menu 454. FIG. 22 shows a resident or patient calling notice on the main video display 440 and a connect icon 462. FIG. 23 shows a health care calling notice on the main video display 440 and the connect icon 462.

Referring again to FIG. 21, the video conference module 430 can initiate a network session with another video conference terminal. To initiate a session request with a resident video conference terminal 12, a remote user 30 may use the remote video conference terminal 26 and select the call patient menu 452 using the user input 406. The remote user 30 may then select a resident patient 12 from a drop down menu (not shown) of patient names (in many cases, there will only be one resident name to select). Upon selection of the name of a resident patient 12, the session module 431 initiates a session request to the specified resident video conference terminal 12. The resident video conference terminal 12 will display a notice that a remote user 30 is calling on the display screen 120. The patient 18 may accept the session request, as explained above, thereby initiating the video conference session.

The remote video conference terminal 26 may also initiate a network session with a health care conference terminal 20. To initiate a session request, a remote user 30 may use the remote video conference terminal 26 and select the call health care menu 454 using the user input 406. The health care user 22 may then select a health care user 22 from a drop down menu (not shown) of names of health care users 22. Upon selection of a health care user 22, the session module 431 initiates a session request to the specified monitoring station video conference terminal 20. A health care user 22 may use the monitoring station video conference terminal 20 to accept the session request, as explained above, thereby initiating the video conference session.

During a video conference session, substantially real-time video of the resident 18 (or care giver 22, as the case may be) will appear on the main video display area 440 for the remote user 30 to see, and audio of the resident 18 (or care giver 22) will be output from the speaker 422. Similarly, substantially real-time video and audio of the remote user 30 will be captured by the camera 410 and microphone 412, for sending to the resident video conference terminal 12 (or remote monitoring terminal 20) by the communications subsystem 408.

The remote video conference terminal 26 may also accept a session request from another video conference terminal, as shown in FIGS. 22 and 23. FIG. 22 shows a session request from a resident video conference terminal 12. A resident calling notice is displayed on the main video display screen 440. FIG. 23 shows a session request from a monitoring station video conference terminal 20. A health care calling notice is displayed on the main video display screen 440. Upon selection of the connect icon 462, the session request is accepted and a video conference session is established between the remote video conference terminal 26 and either the resident video conference terminal 12 or the monitoring station video conference terminal 20.

Figure 24:
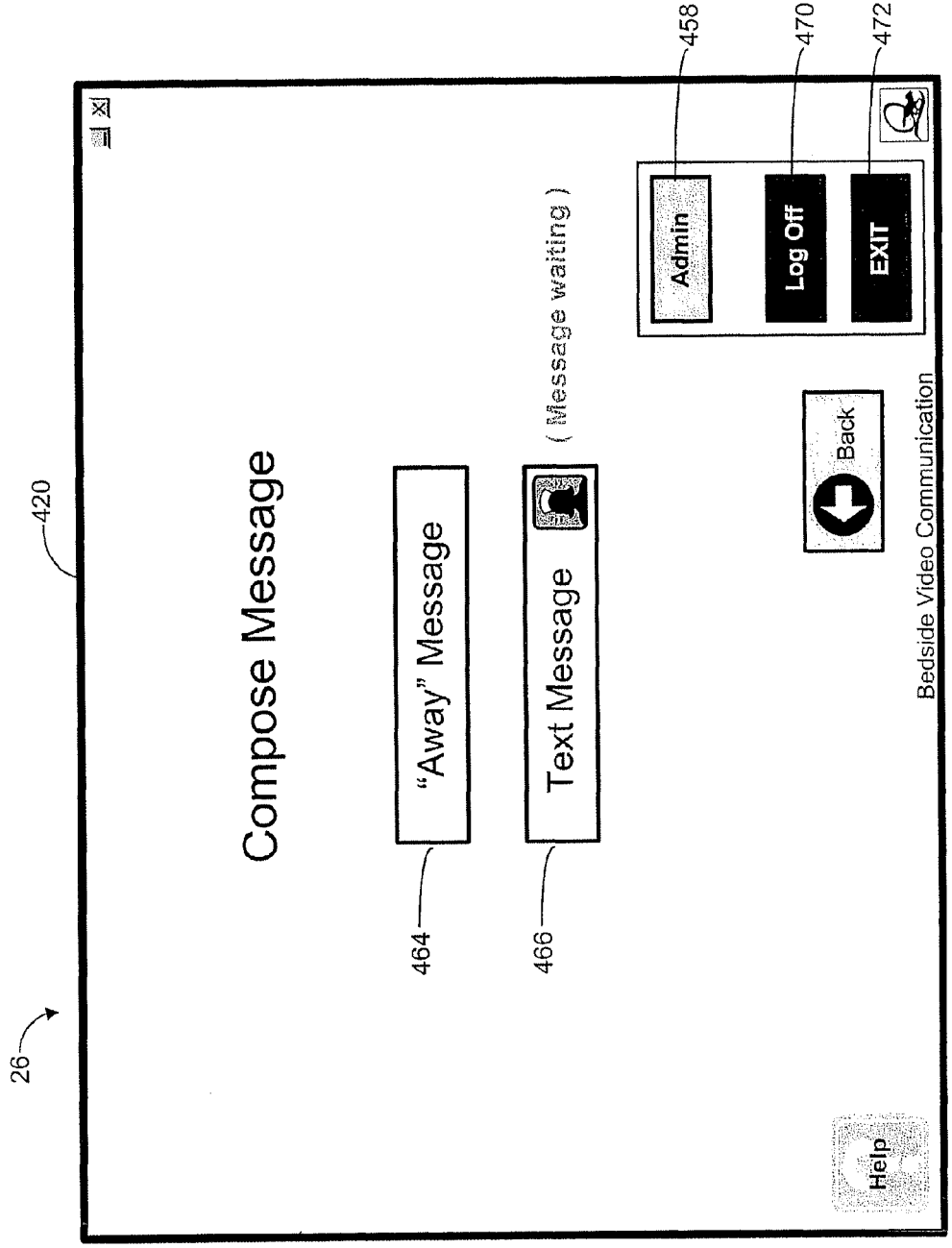
FIG. 24 shows a diagrammatic view of an example graphical user interface of a messaging application for the remote video conference terminal of FIG. 12.

The other modules of controller 400 will now be explained in greater detail. In at least some example embodiments, the messaging module 432 runs a messaging application as illustrated in FIG. 24. As shown, there is an away message icon 464 and a text message icon 466. Selection of the away message icon 464 allows a remote user 30 to compose an away message to be displayed in response to a session request when the remote video conference terminal 26 is offline. The text message icon 466 allows a remote user 30 to compose a text message for sending to the monitoring station video conference terminal 20.

In at least some example embodiments, a security camera module 434 implements a security camera feature when the safety cam icon 456 (FIG. 21) is selected. The main video display area 440 displays a one way video feed (and possible audio) from a local security camera at facility 14 (for example an auxiliary camera 712 or main camera 110 of resident terminal 12 or another camera) located in proximity to the patient 18. Thus, a remote user 30 may be able to remotely monitor the patient 18 and the manner in which the patient 18 is being treated by care giver staff.

In at least some example embodiments, the setup module 436 runs a setup application when the administration icon 458 is selected. Applications that may be run in the setup application include alert forwarding (sends an email notifying a remote user 30 of a session request when the remote video conference terminal 26 is unavailable), password change, and account information.

Conference Server

Figure 25:
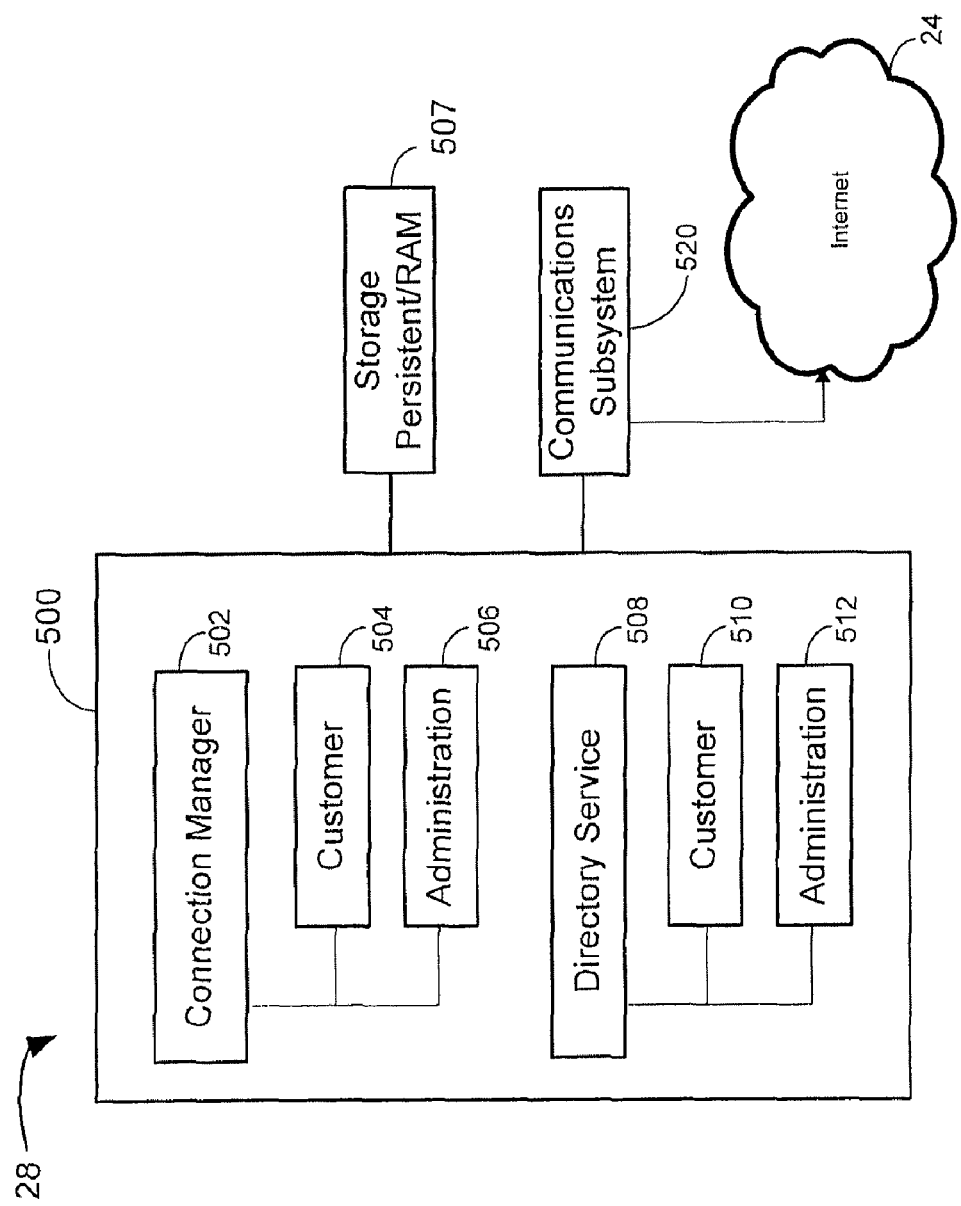
FIG. 25 shows a block diagram of a conference server to be used on the communications system shown in FIG. 1.

Reference is now made to FIG. 25, which shows a block diagram of a conference server 28 to facilitate communications on the communications system 10. Generally, the conference server 28 may manage accounts and log data relating to video conference sessions carried out using the system 10. The conference server 28 may provide access to software updates, and help for users of the communications system 10. The conference server may include a single server or a server cluster. As shown in FIG. 25, the conference server 28 has a controller 500 (implemented by one or more processors) for controlling operation of the conference server 28. Software and data stored on an electronic storage element 507 is used by controller to implement various modules including a connection manager module 502 and a directory service module 508. The connection manager module 502 includes a customer module 504 and an administration module 506. The directory service module 508 includes a customer module 510 and an administration module 512. A communications subsystem 520 is coupled to the controller 400 for sending and receiving communications information over the Internet 24.

The customer module 504 of the connection manager module 502 permits a user to review family and friend online status, find appropriate endpoints by account name, set personal online status, initiate or terminate sessions, manage runtime settings and display items and other operational parameters (for items such as cameras and microphones, favorite links, display preferences), view system alerts (i.e. incoming call attempts), manage the system, and call log.

In at least some example embodiments, the administration module 506 of the connection manager module 502 includes a number of features, permitting an administrator to review online status, review active connections, forced session management (terminate, disconnect, etc), review login and usage statistics for all accounts, and review logs for all accounts.

In at least some example embodiments, the customer module 510 of the directory service module 508 implements a number of features, including history, manage profile, manage account, and help. The history feature maintains a call history with usage metrics, logs the total connection hours, and supports invoicing. The manage profile feature maintains login and account settings, information change, allows a user to change or upload away screens and other graphics, and set customer based limits and thresholds. The manage account feature maintains activation or cancellation of accounts, payment methods, billing methods (per call, bandwidth, etc.), allows viewing of active credits, and account recycling. The help documentation feature maintains frequently asked questions (FAQ), troubleshooting, online instruction manuals, privacy policy, and other agreements.

In at least some example embodiments, the administration module 512 of the directory service module 508 implements a number of features, including customer profile, account information, and current users. The customer profile feature allows viewing of the customer profile (except password and private items), resetting of passwords, and bandwidth restrictions or quality of service. The account information feature allows the change of information as necessary. The current users feature permits viewing of a list of current users logged on.

System Operation

Further features of the video conferencing system 10 will now be described. In at least some example embodiments, a service provider will operate the conference server 28 and provide the hardware and software required for resident terminals 12. The resident terminals 12 can in various embodiments be purchased or leased by the operators of facility 14 from the service provider, or purchased or leased by residents (or their family members) from the service provider, or may be provided by the service provider on loan to the facility 14 and/or residents 18 in exchange for the opportunity to entice remote users 30 (typically family members) or residents to subscribe to video conference services.

In some embodiments, the monitoring station terminal 20 may be acquired (through purchase, lease, license or free loan, for example, under various business models) with the required software from the service provider. In other embodiments, software required to implement the monitoring station terminal 20 on an existing facility computer or server can be acquired (licensed) from the service provider, for example, through an Internet connection to a store front maintained at conference server 28, or installed from a disc or other software medium. In some embodiments, the entity that operates the conference server 28 can be a different entity that the entity that provides any proprietary hardware and software required for implementing the terminals 12, 20 and 26 and server 28.

The software required to implement remote terminals 26 may in example embodiments be licensed for a fee or for free to remote users 30 who subscribe for video conference services, and can be obtained by remote users from the service provider, for example, through an Internet connection to a store front maintained at conference server 28, or installed from a disc or other software medium.

The video conference services facilitated through conference server 28 could be made available for various fees to the different participants. For example, the monitoring station software could be licensed for a fee to the operator of facility 14; remote users and/or residents could sign up for subscription packages billed monthly, yearly, or based on pay per use, or combinations of the forgoing. In some embodiments, the costs for high speed Internet access to resident terminals 12 could be paid for by the operators of facility 14, or remote user's, or residents, or combinations of the forgoing.

In an example embodiment, when a new user (for example, a family member of a resident of a facility 14 that is enabled with resident terminals 12 and a central monitoring terminal 20) desires to set up or register a new account they will access a "New Account" Web page maintained by conference server 28. In an example embodiment, the information collected from the new user while setting up an account can include, among other things: (a) contact information for the new user/subscriber (who may be a family member of a resident 18, for example); (b) billing information (Credit Card, pre-payment by cheque, etc.); (c) resident information, including Resident's name, and a still photo of resident, uploaded for example as a JPEG or other graphics file—the resident photo can be passed on to the resident terminal 12 through the network (Internet 24 and LAN 16) where it is in turn can be retrieved from the resident terminal by any monitoring station terminal 20 that is associated with that resident terminal 12; and (d) Family/friends associated with account, i.e. available for video conference sessions with a resident terminal 12. This information can be made available to the appropriate resident terminal 12, and any monitoring station terminals 20 that are associated with the resident terminal 12. There can be several friends and family members (i.e. remote users) listed (and presented) at the resident terminal 12 as possible parties that video conference sessions can be established with, and for each of the remote users the following information can be collected: (i) Remote user's name (a prompt for a full name for each remote user can be provided as well as a short name or nick name, with the full name being optional for inclusion in the "Families" menu 270 of the monitoring station terminal 20 if communications with the monitoring station terminal 20 are desired, and the short name being used for display on the interfaces presented on the resident terminal 12; (ii) Remote user's email address and/or text message address (optional— required if email or text message communication with monitoring station terminal 20 is desired) (iii) Remote user's still photo (uploaded for example as a JPEG or other graphics file). The photo is passed on to the resident terminal 12 and used by the resident terminal as an image combined with the short name on the resident terminal's touch screen, and acts as the touch screen control for calling (see FIG. 6, for example); (iv) user name; and (v) Password—the conference server 28 can create a default that can be updated through a change password facility.

In one example embodiment, once a terminal 26, 12 or 20 has been suitably configured and appropriate accounts opened with the conference server 28, then a terminal can "log in" with the conference server 28 and provide the server with terminal and/or user identification information and any further authentication information that may be required. In at least some example embodiments, remote terminals 26, and resident terminals 12 and monitoring terminals 20 that are available for video conference sessions through the Internet 24 with remote terminals 26, will be those terminals that are "logged in" or "on-line" with the conference server 28. In the case of remote terminals 26, the log in procedure could for example be carried out by the video conference module 430 (see FIG. 20). For example, such module may have an associated icon displayed the display screen 420 of the remote terminal 26—user selection of such icon initiates a video conference application that implements the video conference module 430 on processor 400. Alternatively, the remote terminal 26 could be configured to initiate the video conference application upon start-up of the remote terminal 26. Once logged-in, the video conference module 430 then stays on-line with the video conference server 28 over Internet 24 until the video conference application is shut down or the Internet connection severed. In some example embodiments, a remote terminal user may alternatively just log-on using a web browser to go to a designated web site hosted by the conference server 28.

In at least some example embodiments, resident terminals 12 and monitoring terminals 20 are each configured to log-in to the conference server 28 through the Internet 24 once they are turned on, and to remain logged in so long as a connection exists through the Internet 24 to the conference server 28. Furthermore, as the monitoring terminal(s) 20 and resident terminals 12 within a care facility 14 are each connected to a common enterprise network 16 in at least one example configuration, such the resident terminals 12 are aware through communications over the enterprise network 16 of the monitoring terminal(s) 20 present on the network 16, and the monitoring terminal(s) 20 is (are) aware of the resident terminals 12 present on the network. In some embodiments, users of terminals 12, 20 and 26 can select an "unavailable status", even when in a logged state, indicating that the user's terminal is unavailable to accept incoming video conference requests.

The conference server 28 maintains a log of what terminals 12, 20, and 16 are currently online, and the availability status of such on-line terminals for accepting incoming video conference requests. The server can be configured to periodically poll the on-line terminals to determine if their status changes, and the terminals can also be configured to notify the server 28 of any changes in their status (for example if a terminal logs off, or goes from being available to accept incoming session requests to unavailable).

In one example embodiment, a resident terminal 12 can periodically poll the conference server 28 to track which of the remote terminals 26 that it is associated with (i.e. terminals 26 used by remote users that the resident terminal 12 is preconfigured to initiate video conference sessions with) are presently logged in to the conference server and available for accepting video conference calls from the resident terminal— using this information, the resident terminal 12 can then "fade in" or "fade out" thumbnail images 156, 158 (see FIG. 6) depending on the on-line/availability status of the respective remote users. The conference server 28 can also be configured to push such status information out to affected resident terminals 12 when the conference server 28 becomes aware of changes in the status of a remote terminal 26 associated with a particular resident terminal 12. Similarly, remote terminals 26 can also acquire information from the conference server 28 about the status of their associated resident terminals 12.

In example embodiments, resident terminals 12 can exchange status/availability information with relevant monitoring units 20 directly through enterprise network 16 without going through the conference server 28, however in at least one example embodiment, such communications could alternatively be coordinated through the conference server 28.

Figure 26:
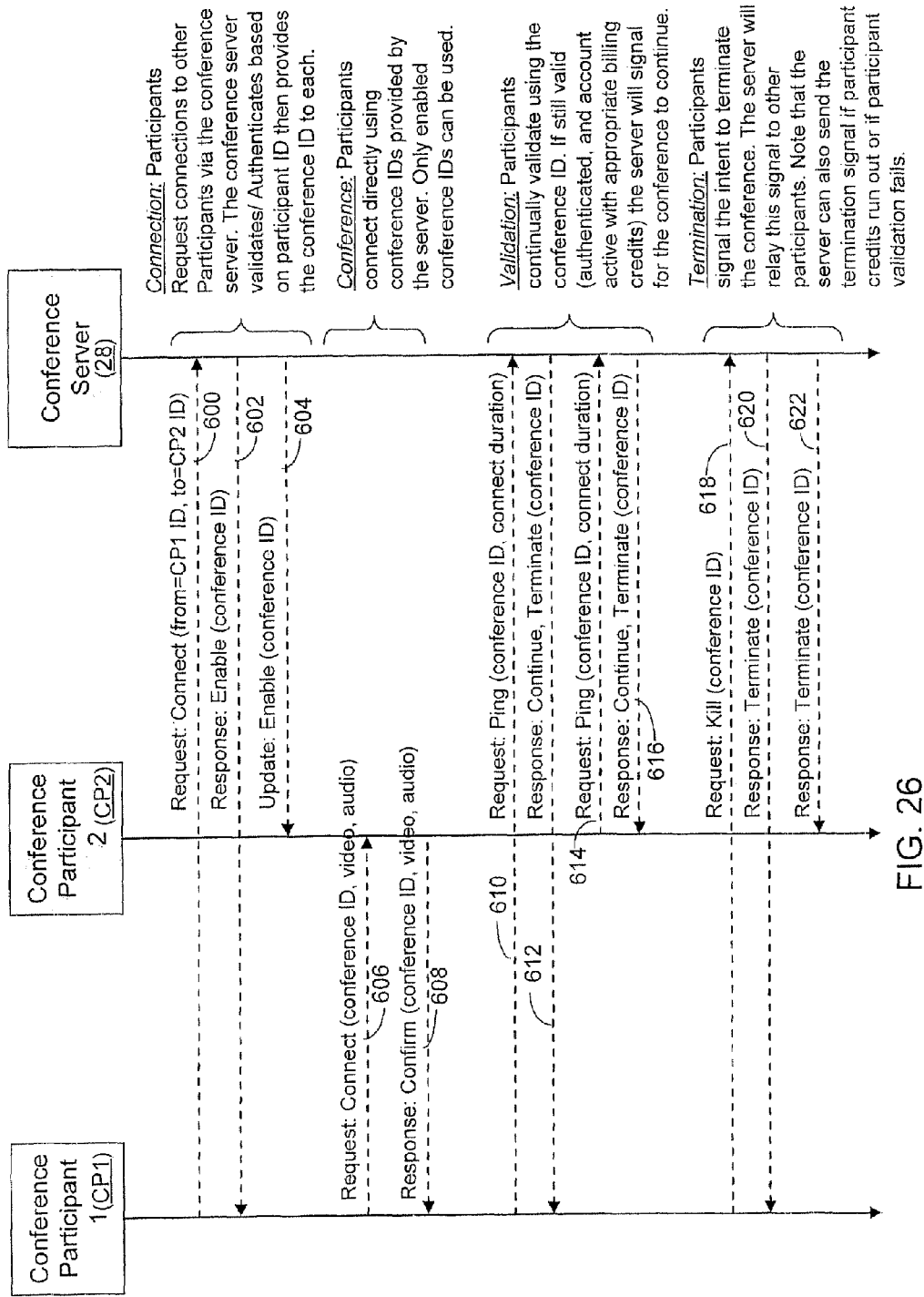
FIG. 26 shows a diagram illustrating conference session management according to an example embodiment.

An example conference session between a remote terminal 26 and a terminal located within the enterprise network 16 (for example a resident terminal 12 or monitoring terminal 26) will now be discussed with reference to the conference session management messaging diagram of FIG. 26. In the diagram of FIG. 26, for the purpose of the following example conference participant 1 (CP1) represents a resident terminal 12 and conference participant 2 (CP2) represents a remote terminal 26. When a resident user of a resident terminal 12 selects a remote user to call by selecting an on-screen button associated with the remote user (for example, the "Rick" button 156 of FIG. 6), terminal CP1 sends a connect request message to the conference server 28 (see step 600). The connect request message includes information identifying the sending terminal (CP1 ID) and information identifying the target recipient terminal (CP2 ID). In response to the connect request message, the conference server 28 validates and/or authenticates the two conference participants (for example, the conference server 28 may ensure the terminals CP1 and CP2 are properly logged in, and associated with an active account having appropriate billing credits), and then provides a unique conference ID to each of the initiating and target terminals in a conference enable message (steps 602, 604) that is sent to the initiating terminal CP1 in the form of a response message and to the target terminal CP2 as an update message.

Once the conference enable messages have been sent to the participating terminals, the terminals connect directly using the conference ID provided by the conference server 28. In particular, in the example shown in FIG. 26, after receipt of the conference enable message, the initiating terminal CP1 then sends a connect request message to the target terminal CP2 that includes the conference ID, and the target terminal CP2 then sends a conformation message to the target terminal CP1 that includes the conference ID, thereby establishing a bi-directional video conference session in which video and data are exchanged.

During the video conference session, the participating terminals CP1 and CP2 each periodically validate the ongoing session with the conference server 28 using the conference ID (see steps 610, 612, 614 and 616). So long as the conference server 28 concludes that the conference ID is still valid (the server 28 may for example check to confirm that a time credit is still outstanding on a prepaid account, or that costs or time have not exceeded a predetermined limit), then the server will signal for the ongoing conference session to continue.

Either of the participants can terminate a video conference session by selecting the "End Call" option at their respective terminal. As indicated at step 618, when a participant selects the "End Call" option, the participant's terminal (terminal CP1 in FIG. 26) sends a Kill Request message to the conference server 28 that includes the conference ID. The conference server 28 then sends a terminate session message to each of the participating terminals CP1, CP2, to end the session (steps 618, 620). The conference server 28 can also terminate the video conference session unilaterally by sending the terminate signals to the participating terminals CP1 and CP2, for example if participant credits run out or the ongoing conference validation in steps 610-616 otherwise fails.

The messaging diagram of FIG. 26 has been described above in respect of a video conference session initiated by a resident terminal 12 with a target remote terminal 26. The diagram would be similar for a video conference session initiated by a remote terminal 26 with a target resident terminal 12, with the roles of the two terminals being reversed. Similarly, video conference sessions between a monitoring terminal 20 and a remote terminal 26 could also be carried out as shown in FIG. 26. In at least some example embodiments, video conference sessions within the enterprise network 16 are managed directly between the resident terminals 12 and the monitoring terminal(s) 20 without involving the conference server 28, however in some example embodiments even sessions between resident terminals 12 and the monitoring terminal(s) 20 could be managed through the conference sever 28 using the methodology shown in FIG. 26.

It will be appreciated that video conference sessions could be managed by the conferencing server 28 in a manner that is different than what is shown in the example diagram of FIG. 26. In example embodiments in which the conference server 28 participates in the set up, ongoing authorization, and subsequent tear down of video conference sessions, the conference server is able to track for accounting and billing purposes information about the video conference sessions that involve remote terminals 26, including the identity of terminals 12, 20, 26 involved and the duration of the video conference sessions.

In some example embodiments, the conference server 28 can facilitate and track one-way video monitoring sessions in which video from resident terminal camera 712 and/or camera 110 is streamed from a resident terminal to a remote terminal 26 in much the same way as a two-way video conference session is facilitated. In some example embodiments, resident terminals 12 can be enabled to include a VoIP (Voice Over Internet Protocol) function allowing such terminals to initiate and receive VoIP calls to and from remote terminals 26 and other remote communications devices.

Although the communication system 10 has been described above in the context of care facilities, embodiments of the system could also be applied to facilities or organizations having residents that wish to communicate with remotely located family members or other parties, including, but not limited to, for example, detention facilities, boarding schools, summer camps, and military camps.

While the invention has been described in detail in the foregoing specification, it will be understood by those skilled in the art that variations may be made without departing from the scope of the invention, being limited only by the appended claims.

What is claimed is:

1. A video conferencing system for facilitating communications between residents of a health care facility and care givers within the health care facility or remote users located outside of the health care facility, comprising:
   a plurality of resident video conference terminals connected to a local area network within the health care facility, each resident terminal being associated with a resident of the health care facility and having stored thereon information identifying at least one remote user terminal located external to the local area network and that the resident terminal is associated with, each resident terminal being configured to display on a screen thereof a first visual image that can be selected by a user thereof to initiate a video conference session with the at least one remote user terminal associated therewith;
   a nursing station terminal connected to the local area network within the health care facility for use by a care giver of the health care facility, the nursing station terminal being configured for establishing video conference sessions through the local area network with the resident terminals,
   wherein the resident terminals are each configured for displaying on the screen thereof a second visual image that can be selected by a user thereof to initiate a video conference session with the nursing station terminal; and
   a remote conference server located external to the health care facility and in communication with the plurality of resident terminals and the remote user terminals that are associated with the resident terminals, the conference server tracking usage information for video conference sessions that are established between the resident terminals and the remote user terminals associated therewith.

2. The video conferencing system of claim 1 wherein the remote conference server is connected to the resident terminals through the local area network and a wide area network, and is connected to the remote terminals through the wide area network.

3. The video conference system of claim 1 wherein the conference server is configured for receiving video conference request messages from the resident terminals and providing conference enabling information to resident terminals and the remote terminals in response to the conference request messages.

4. The video conference system of claim 1 further including a plurality of the nursing station terminals connected to the local area network within the health care facility for use by a care giver of the health care facility, the nursing station terminals each being assigned group of resident terminals and being configured for establishing video conference sessions through the local area network with the resident terminals assigned thereto, and wherein the resident terminals are each configured for displaying on the screen thereof a visual image that can be selected by a user thereof to initiate a video conference session with the nursing station terminal assigned thereto, and wherein each of the nursing station terminals are configured to present a transfer option to user thereof whereby the group of resident terminals assigned to a particular nursing station terminal can be re-assigned as a group to a further one of the nursing station terminals.

5. The video conference system of claim 1 wherein at least some of the remote user terminals are compact mobile devices enabled for wireless communication over a wireless network.

6. The video conference system of claim 1 wherein at least some of the resident terminals are each coupled to an auxiliary camera for monitoring care of the resident associated therewith, and the at least some resident terminals are each configured for, in a resident monitoring mode, transmitting video images from the auxiliary camera to the at least one remote user terminal associated therewith.

7. The system of claim 1 wherein at least some of the resident video conference terminals are tablet sized terminals wherein the first and second images are simultaneously displayed as first and second user selectable buttons, respectively, sized so that they can be easily seen and used by a person having reduced cognitive abilities, and the resident video conference terminals are configured to initiate a video conference session with the remote terminal after user selection of the second user selectable button without requiring any further user action, and the resident video conference terminals are configured to initiate a video conference session with the nursing station terminal after user selection of the first user selectable button without requiring any further user action.

8. A method of facilitating video conference sessions between residents of a care facility and care givers within the care facility or remote parties who are outside of the care facility, comprising:
providing resident terminals for use by residents of a care facility for video conference sessions, the resident terminals each having a user interface configured for use by a person having at least one of reduced cognitive abilities and reduced physical abilities;
assigning at least some of the resident terminals to specific residents of the care facility and storing at each resident video conference terminal assigned to a resident information identifying at least one remote terminal associated with the resident video conference terminal;
providing a nursing station terminal for use by a care giver of the care facility for selective video conference sessions with resident terminals; and
displaying as part of the user interface on each resident terminal a first user selectable image which when selected initiates a video conference session with the remote terminal associated therewith and a second user selectable image which when selected initiates a video conference session with the nursing station terminal.

9. The method of claim 8 including storing at a remote server that is in communication with the resident terminals and the remote terminals information identifying the resident terminals and the remote terminals associated with each of the resident terminals.

10. The method of claim 8 including receiving requests at the remote server from resident terminals requesting video conference sessions with specified remote terminals and validating the requests to enable video conference sessions to proceed.

11. The method of claim 8 including storing in at least some of the resident terminals a picture of a person associated with the remote terminal associated therewith, the user interface including a user selectable representation of the picture as the first user selectable image.

12. A video conferencing system for facilitating communications between residents of a health care facility and care givers within the health care facility or remote users located outside of the health care facility, comprising:
a plurality of resident video conference terminals within the health care facility, each resident terminal being associated with a resident of the health care facility and having stored thereon information identifying at least one remote user terminal located external to the health care facility and that the resident terminal is associated with, each resident terminal being configured to display on a screen thereof a first visual image that can be selected by a user thereof to initiate a video conference session with the at least one remote user terminal associated therewith;
a nursing station terminal within the health care facility for use by a care giver of the health care facility, the nursing station terminal being configured for establishing video conference sessions with the resident terminals,
wherein the resident terminals are each configured for displaying on the screen thereof a second visual image that can be selected by a user thereof to initiate a video conference session with the nursing station terminal.

* * * * *